US008250284B2

(12) United States Patent
Nakamichi et al.

(10) Patent No.: US 8,250,284 B2
(45) Date of Patent: Aug. 21, 2012

(54) ADAPTIVE MEMORY ALLOCATION OF A SECOND DATA STORAGE VOLUME BASED ON AN UPDATED HISTORY OF CAPACITY OF A FIRST DATA VOLUME

(75) Inventors: Koh Nakamichi, Yokohama (JP); Yuichi Taguchi, Sagamihara (JP)

(73) Assignee: Hitachi, Ltd., Tokyo (JP)

( * ) Notice: Subject to any disclaimer, the term of this patent is extended or adjusted under 35 U.S.C. 154(b) by 198 days.

(21) Appl. No.: 12/664,991

(22) PCT Filed: Oct. 23, 2009

(86) PCT No.: PCT/JP2009/005602
§ 371 (c)(1),
(2), (4) Date: Dec. 16, 2009

(87) PCT Pub. No.: WO2011/048640
PCT Pub. Date: Apr. 28, 2011

(65) Prior Publication Data
US 2011/0231580 A1 Sep. 22, 2011

(51) Int. Cl.
G06F 13/00 (2006.01)
G06F 3/00 (2006.01)
G06F 13/12 (2006.01)
(52) U.S. Cl. .............................. 711/100; 710/15; 710/72
(58) Field of Classification Search .................. None
See application file for complete search history.

(56) References Cited

U.S. PATENT DOCUMENTS

| 6,934,826 B2 * | 8/2005 | Lubbers et al. ............... 711/170 |
| 2007/0198328 A1 | 8/2007 | Fuller et al. |
| 2008/0215812 A1 | 9/2008 | Eguchi |
| 2008/0250079 A1 | 10/2008 | Eguchi |
| 2008/0301325 A1 | 12/2008 | Hirata |
| 2009/0077340 A1 | 3/2009 | Johnson et al. |

FOREIGN PATENT DOCUMENTS

| JP | 2004-72135 | 3/2004 |
| JP | 2005-209149 | 8/2005 |
| JP | 2005-222110 | 8/2005 |
| WO | 2007092615 A2 | 8/2007 |

* cited by examiner

Primary Examiner — Alan Chen
(74) Attorney, Agent, or Firm — Brundidge & Stanger, P.C.

(57) ABSTRACT

An object of the present invention is to properly estimate a storage capacity or the performance of a storage device to be prepared in a remote site.
In an information system 1, a first storage device 100 stores data of a first host computer 200 in a first virtual volume provided by thin provisioning using a first volume as a resource, and a second storage device 100 stores data of a second host computer 200 in a second virtual volume provided by thin provisioning using a second volume as a resource. An information apparatus (management device 400) in the information system 1 acquires the history of data writing in the new data area of the first volume on the basis of the base volume and the differential volume, then generates a transition of an allocation capacity of a storage area of the first volume on the basis of the acquired history of data writing in a new data area of the first volume. The information apparatus then finds, on the basis of the generated transition, a capacity of the second volume to be required after a predetermined period of time.

13 Claims, 35 Drawing Sheets

RAID GROUP CONFIGURATION INFORMATION 1101

| RAID GROUP IDENTIFICATION INFORMATION 11011 | MAGNETIC STORAGE IDENTIFICATION INFORMATION 11012 | | | |
|---|---|---|---|---|
| | #1 | #2 | #3 | #4 |
| RG01 | HD01 | HD02 | HD03 | HD04 |
| RG11 | HD11 | HD12 | HD13 | HD14 |
| -- | -- | -- | -- | -- |

FIG. 11

STORAGE AREA CONFIGURATION INFORMATION 1102

| STORAGE AREA IDENTIFICATION INFORMATION 11021 | RAID GROUP IDENTIFICATION INFORMATION 11022 |
|---|---|
| LD01 | RG01 |
| LD02 | RG02 |
| LD03 | RG03 |
| LD04 | RG04 |
| -- | -- |

FIG. 12

VIRTUAL STORAGE AREA POOL CONFIGURATION INFORMATION

| VIRTUAL STORAGE AREA POOL IDENTIFICATION INFORMATION | STORAGE AREA IDENTIFICATION INFORMATION |
|---|---|
| PL01 | LD01 |
| | LD05 |
| | LD10 |
| PL02 | LD02 |
| | LD0A |
| --- | --- |

FIG. 13

VIRTUAL STORAGE AREA CONFIGURATION INFORMATION

| VIRTUAL STORAGE AREA POOL IDENTIFICATION INFORMATION | VIRTUAL STORAGE AREA IDENTIFICATION INFORMATION |
|---|---|
| PL01 | VD01 |
| | VD02 |
| | VD03 |
| PL02 | VD10 |
| | VD0F |
| --- | --- |

FIG. 14

WRITE DATA TRANSFER DESTINATION INFORMATION

| HOST COMPUTER STORAGE AREA IDENTIFICATION INFORMATION | TRANSFER DESTINATION ADDRESS INFORMATION |
|---|---|
| /mount/data1 | 192.168.0.1 |
| /mount/data2 | 192.168.0.1 |
| --- | --- |

BACKUP DATA ARCHIVE LOCATION INFORMATION

| COMMUNICATION INTERFACE IDENTIFICATION INFORMATION | LOGICAL STORAGE UNIT IDENTIFICATION INFORMATION | BACKUP DATA ARCHIVE LOCATION INFORMATION ||
|---|---|---|---|
| | | BASE DATA ARCHIVE LOCATION INFORMATION | DIFFERENTIAL DATA ARCHIVE LOCATION INFORMATION |
| 50:00:FA:01:1E:0A:E8:01 | LU11 | /mount/baSe001 | /mount/diff001 |
| 50:00:FA:01:1E:0A:E8:02 | LU12 | /mount/baSe002 | /mount/diff002 |
| --- | --- | --- | --- |

BASE VOLUME UPDATE TIME INFORMATION

BACKUP MANAGEMENT INFORMATION

DIFFERENTIAL VOLUME DATA INFORMATION

| TIME | COMMUNICATION INTERFACE IDENTIFICATION INFORMATION (41012) | LOGICAL STORAGE UNIT IDENTIFICATION INFORMATION (41016) | BLOCK ADDRESS (41013) |
|---|---|---|---|
| 2009/04/06 12:00 | 50:00FA:01:1E:0A:E8:01 | LU11 | 0xEFF0 |
| 2009/04/06 15:00 | 50:00FA:01:1E:0A:E8:01 | LU11 | 0x2000 |
| 2009/04/06 18:00 | 50:00FA:01:1E:0A:E8:01 | LU11 | 0x8010 |

(41011 = TIME)

| DATA ENTITY IDENTIFICATION INFORMATION (41014) | DATA (41015) |
|---|---|
| 0A:01 | 101110101001110101100011111011010110100110100101 |
| 0A:02 | 001011010001010101010101010101010101111101001011 |
| 0A:03 | 101010101010101010101010100101010100001010101010 |

PAGE ALLOCATION MAP INFORMATION

| PAGE IDENTIFICATION INFORMATION | PAGE AREA | | PAGE ALLOCATION TIME |
|---|---|---|---|
| | PAGE START BLOCK ADDRESS | PAGE END BLOCK ADDRESS | |
| P_01 | 0x0000 | 0x2FFF | 2008/10/26 12:00 |
| P_02 | 0x3000 | 0x5FFF | -- |
| P_03 | 0x6000 | 0x8FFF | 2008/10/26 12:00 |
| P_04 | 0x9000 | 0xBFFF | -- |
| P_05 | 0xC000 | 0xEFFF | 2009/04/06 12:00 |
| ... | ... | ... | ... |

FIG. 23

OPERATION MONITORING INFORMATION

| | IOPS | | | |
|---|---|---|---|---|
| COMMUNICATION I/F IDENTIFICATION INFORMATION | 50:00:FA:01:1E:0A:E8:01 | | 50:00:FA:01:1E:0A:E8:02 | |
| LOGICAL UNIT IDENTIFICATION INFORMATION | LU11 | LU12 | LU21 | ... |
| 2008/10/26 12:00 | 150 | 50 | 250 | - |
| 2008/10/26 15:00 | 200 | 90 | 350 | - |
| 2008/10/26 18:00 | 80 | 70 | 50 | - |
| 2009/04/06 12:00 | 250 | 150 | 400 | - |
| 2009/04/06 15:00 | 275 | 200 | 340 | - |
| 2009/04.06 18:00 | 190 | 120 | 100 | - |

FIG. 39

ADAPTIVE MEMORY ALLOCATION OF A SECOND DATA STORAGE VOLUME BASED ON AN UPDATED HISTORY OF CAPACITY OF A FIRST DATA VOLUME

TECHNICAL FIELD

The present invention relates to an information system, an information apparatus and a method of controlling an information apparatus.

BACKGROUND ART

PTL 1 describes a technique related to a storage system which allows access to multiple logical devices regardless of the number of ports included in the storage system and the number of logical devices that can be mapped to a single port. The storage system includes multiple logical devices, a target device that is an access target of a computer, and a jukebox control mechanism that maps any one of the multiple logical devices to the target device. For the purpose of improving the usability of the logical storages, the jukebox control mechanism changes the logical device mapped to the target device to another in accordance with a request from the computer.

PTL 2 describes a technique related to a computer system in which a computer and a storage system are coupled to each other via a network, and in which data processed by the computer is transmitted to and received by the storage system via the network and then stored in the storage system. For the purpose of restoring data of the computer system at high speed at an event of a failure, this computer system operates as follows. Specifically, a first storage system on the master side processes an I/O request from the host and transmits updated data obtained as a result of the I/O process to a second storage system on the remote side. Then, the second storage system retains the data received from the first storage system as updated log data. The host transmits as data a command that fixes the state of an application, to the first storage system, and the first storage system transfers this data to the second storage system. Both the host and the second storage system retain an identifier corresponding to the command. The identifier and the log data are associated with each other. Thereby, when the host designates the identifier at a given point of time, the second storage system restores the data at the given point of time.

PTL 3 relates to a technique to assist a network administrator in identifying a section where a bottleneck has occurred. Patent Document 3 describes a storage network system including: computers; storage devices; coupling devices that control the coupling relationship among the computers and the storage devices; and a management device that manages the computers, the storage devices and the coupling devices. In this storage network system, a controller of the management device specifies coupling ports of the computers, the storage devices and the coupling devices, which form the storage network system.

Then the controller of the management device displays, on a display unit, data traffic at each of the coupling ports for each coupling path, the coupling paths coupling a coupling port of each of the computers to a coupling port of each of the storage devices.

CITATION LIST

Patent Literature

PTL 1 Japanese Patent Application Laid-open Publication No. 2005-209149

PTL 2 Japanese Patent Application Laid-open Publication No. 2005-222110

PTL 3 Japanese Patent Application Laid-open Publication No. 2004-72135

SUMMARY OF INVENTION

Technical Problem

In a system configured to continue a task in a remote site when a local site operating in the actual environment is struck by a disaster, the operation of the remote site at the time of the disaster is temporary, in general. Accordingly, the capacity of the storage unit of the storage device in the remote site does not have to be large as compared with the capacity thereof prepared in the local site. Thus, the capacity of the storage unit prepared in the remote site is preferably as small as possible from a viewpoint of the operation costs or the like. Meanwhile, from a viewpoint of preventing the capacity of the storage unit in the remote site from running-out, the storage capacity of the storage unit to be prepared in the remote site needs to be properly estimated.

The present invention has been made in view of the aforementioned background. An object of the present invention is to provide an information system, an information apparatus and a method of controlling an information apparatus that is capable of properly estimating the storage capacity or performance of a storage unit to be prepared in a remote site.

Solution to Problem

One aspect of the present invention to solve the aforementioned and other problems provides an information system comprising: a first host computer; a first storage device coupled to the first host computer and that stores data sent from the first host computer in a first volume; a first backup device coupled to the first host computer; a second host computer; a second storage device coupled to the second host computer and that stores data sent from the second host computer in a second volume; a second backup device coupled to the second host computer; and an information apparatus coupled to the second backup device, wherein the first backup device and the second backup device are coupled to each other, the first backup device manages a base volume that is a volume in which a status of the first volume at a particular point of time is stored, and a differential volume that is a volume in which a difference between the first volume at the particular point of time, and the first volume updated after the particular point of time is stored, the second backup device manages a copy of each of the base volume and the differential volume, the first storage device stores the data sent from the first host computer in the first volume, the second storage device stores the data sent from the second host computer in a second virtual volume provided by thin provisioning using the second volume as a resource, and the information apparatus acquires, on the basis of the base volume and the differential volume, the history of data writing in the new data area of the first volume, then generates, on the basis of the acquired history of data writing, a transition of an allocation capacity of a storage area of the first volume, and finds, on the basis of the generated transition, a capacity of the second volume to be required after a predetermined period of time.

According to the present invention, a transition in the capacity (page allocation capacity) of a volume required for providing a virtual volume in thin provisioning at a second storage device is calculated on the basis of a history (write address and write amount) of writing of data by the host apparatus to the volume, is the history being accumulated in a differential volume in CDP (Continuous Data Protection). Then, the capacity of a second volume to be required after a predetermined period of time can be obtained on the basis of the transition. With this advantage, the user such as a restore operator can find out, from the tendency of the calculated allocation capacities, the minimum required capacity in the future and thus can prepare in a remote site a volume having a capacity necessary and sufficient during a period until the recovery of the system. This makes it possible to operate the information system while reducing the storage resource and operation costs thereof to the minimum required levels.

The problem disclosed in the present application and the solving method thereof will be made clear in the section of a detailed description of the preferred embodiments with reference to the accompanying drawings.

ADVANTAGEOUS EFFECTS OF INVENTION

According to the present invention, the storage capacity or the performance of a storage unit to be prepared in a remote site can be properly estimated.

BRIEF DESCRIPTION OF DRAWINGS

FIG. 11 is a diagram showing an example of RAID group configuration information 1101.

FIG. 12 is a diagram showing an example of storage area configuration information 1102.

FIG. 13 is a diagram showing an example of virtual storage area pool configuration information 1103.

FIG. 14 is a diagram showing an example of virtual storage area configuration information 1104.

FIG. 17 is a diagram showing an example of write data transfer destination information 2103.

FIG. 18 is a diagram showing an example of backup data archive location information 3110.

FIG. 21 is a diagram showing an example of differential volume data information 4101.

FIG. 23 is a diagram showing an example of page allocation map information 4103.

FIG. 39 is a diagram showing an example of operation monitoring information 1201.

DESCRIPTION OF EMBODIMENTS

Hereinafter, descriptions will be given of a mode for carrying out the invention with reference to the drawings.

EXAMPLE 1

<Physical Configuration>

Figure 1:
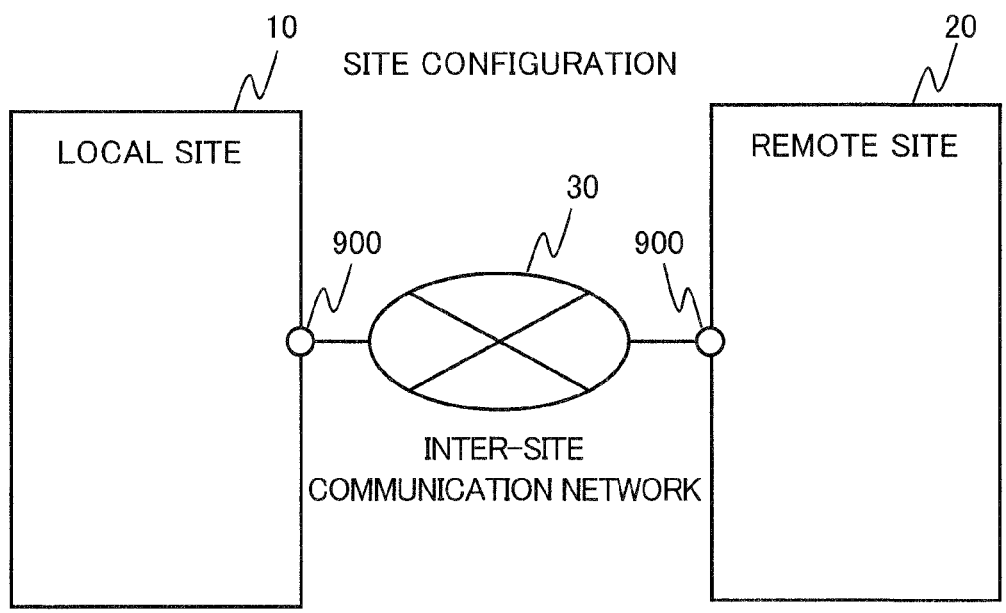
FIG. 1 is a diagram showing a configuration of a site in which an information system 1 is operated.

FIG. 1 shows a configuration of a site in which an information system 1 described as Example 1 is operated. As shown in FIG. 1, the information system 1 includes: a device group installed in a local site 10, which provides an operation service to a user at ordinary times (during a normal operation); and a device group installed in a remote site 20, which becomes a substitute site for the operation service when the local site 10 is struck by a disaster. The device group of the local site 10 and the device group of the remote site 20 are communicatively coupled to each other via an inter-site communication network 30. Note that, in addition to the case where the local site 10 and the remote site 20 exist in the relationship of 1:1 as shown in FIG. 1, the local site 10 and the remote site 20 may exist in the relationship of 1:n, n:1 or m:n, for example.

Figure 2:
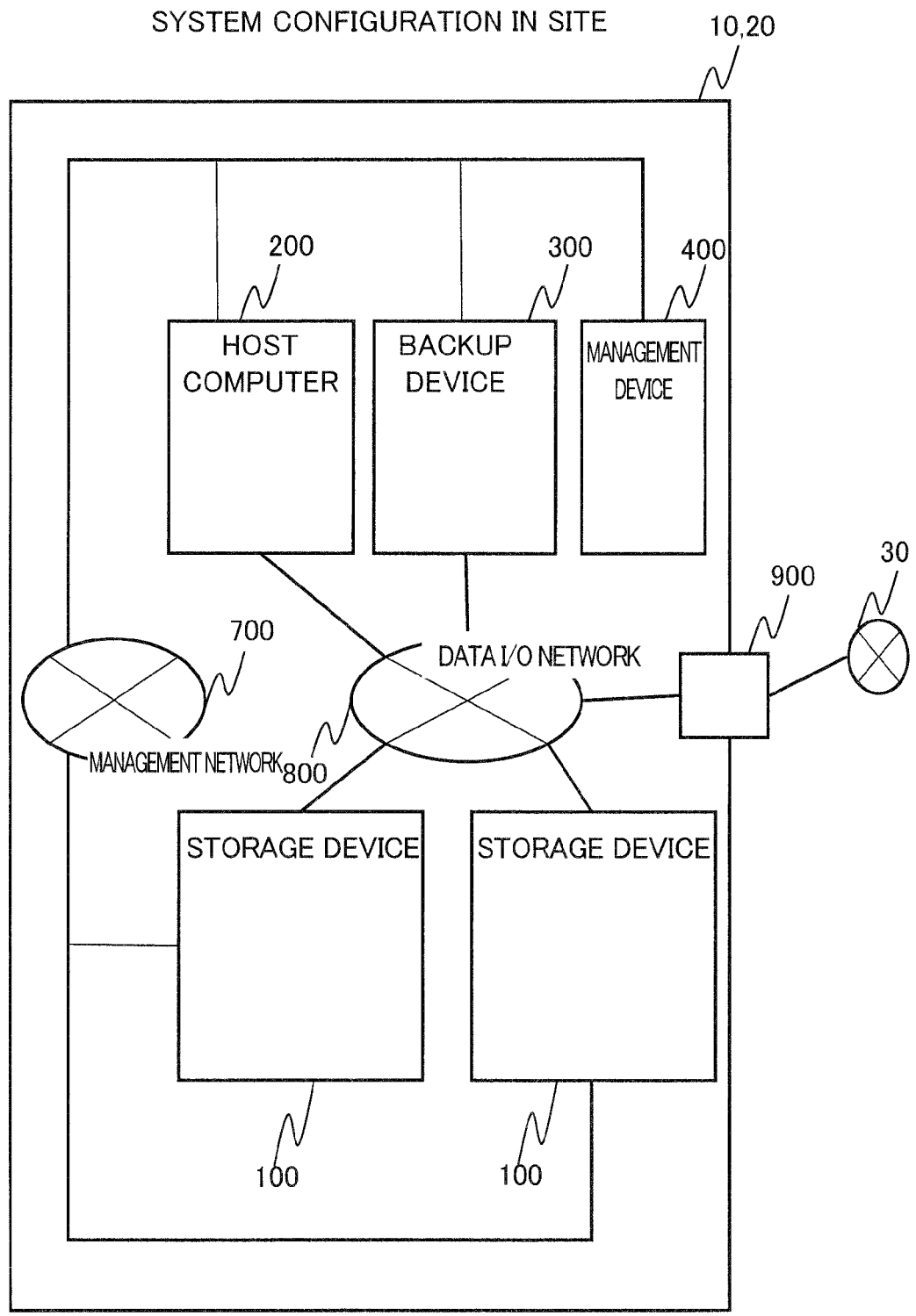
FIG. 2 is a diagram showing a schematic configuration of a device group in a local site 10 or a remote site 20.

FIG. 2 shows a schematic configuration of the device group in the local site 10 or the remote site 20. As shown in the drawing, storage devices 100, a host computer 200, a backup device 300 and a management device 400 are operated in each of the local site 10 and the remote site 20.

As shown in FIG. 2, the storage devices 100, the host computer 200 and the backup device 300 are communicatively coupled to each other via a data I/O network 800 (network is abbreviated as NW in the drawings). The data I/O network 800 is coupled to the aforementioned inter-site communication network 30 via a network coupling device 900. The data I/O network 800 is a SAN (Storage Area Network), LAN (Local Area Network), WAN (Wide Area Network), the Internet or the like, for example. In addition, the storage devices 100, the host computer 200, the backup device 300 and the management device 400 are communicatively coupled to each other via a management network 700. The management network 700 is a LAN, WAN, the Internet or the like, for example.

Figure 3:
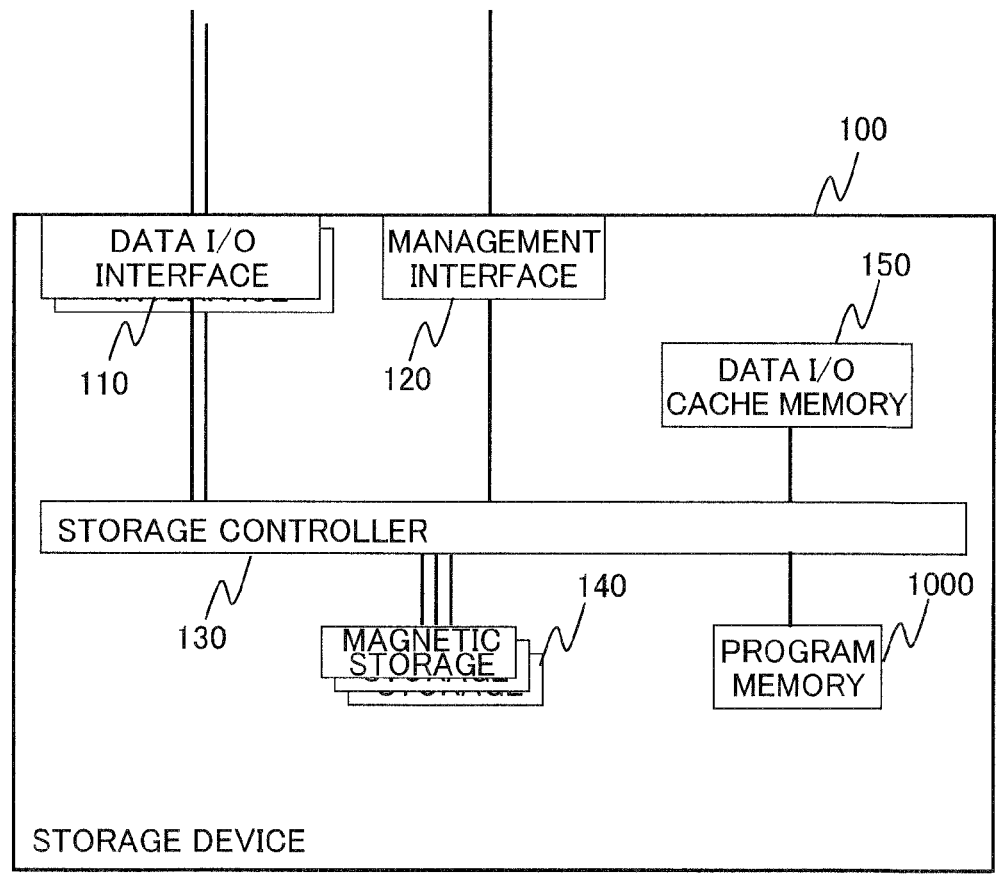
FIG. 3 is a diagram showing an example of a physical configuration of a storage device 100.

FIG. 3 shows an example of the physical configuration of the storage device 100. As shown in FIG. 3, the storage device 100 includes a data I/O interface 110, a management interface 120, a storage controller 130, a program memory 1000, a data I/O cache memory 150 and a magnetic storage 140. These components are communicatively coupled to each other via the storage controller 130.

The data I/O interface 110 is coupled to the data I/O network 800 and inputs and outputs data to and from the host computer 200, the backup device 300 or another storage device 100. The management interface 120 is coupled to the management network 700 and inputs and outputs management information to and from the host computer 200, the backup device 300, another storage device 100 or the management device 400. The storage controller 130 is implemented by a processor or the like that executes programs. The storage controller 130 then performs various types of control in the storage device 100. The program memory 1000 is configured of a volatile or non-volatile semiconductor memory, a magnetic storage or the like, and stores therein a program for implementing a function of the storage device 100, and data. The data I/O cache memory 150 is a primary storage area used for the purpose of, for example, speeding up data input/output between the host computer 200 and the magnetic storage 140. The magnetic storage 140 is a hard disk drive or the like, and stores therein data used by the host computer 200. The storage device 100 provides a physical or a logical storage area (hereinafter, referred to as a volume) to the host computer 200 by use of a storage area provided by the magnetic storage 140. Note that, the storage device 100 may include a semiconductor memory (SSD: Solid State Drive) instead of the magnetic storage 140 or together with the magnetic storage 140.

As an example of the storage device 100, a disk array device including multiple magnetic storages 140 (or semiconductor memory devices) is cited. The disk array device includes: a cache memory having a large capacity; at least one channel controller that controls communications between the host computer 200 and the cache memory; and a disk controller that controls communications between the cache memory and a recording medium. Most of the disk array devices employ RAID (Redundant Array of Independent Disk) technology. In this case, a RAID group is formed of the multiple magnetic storages 140 and the aforementioned volume is composed by use of the storage area provided by this RAID group.

Figure 4:
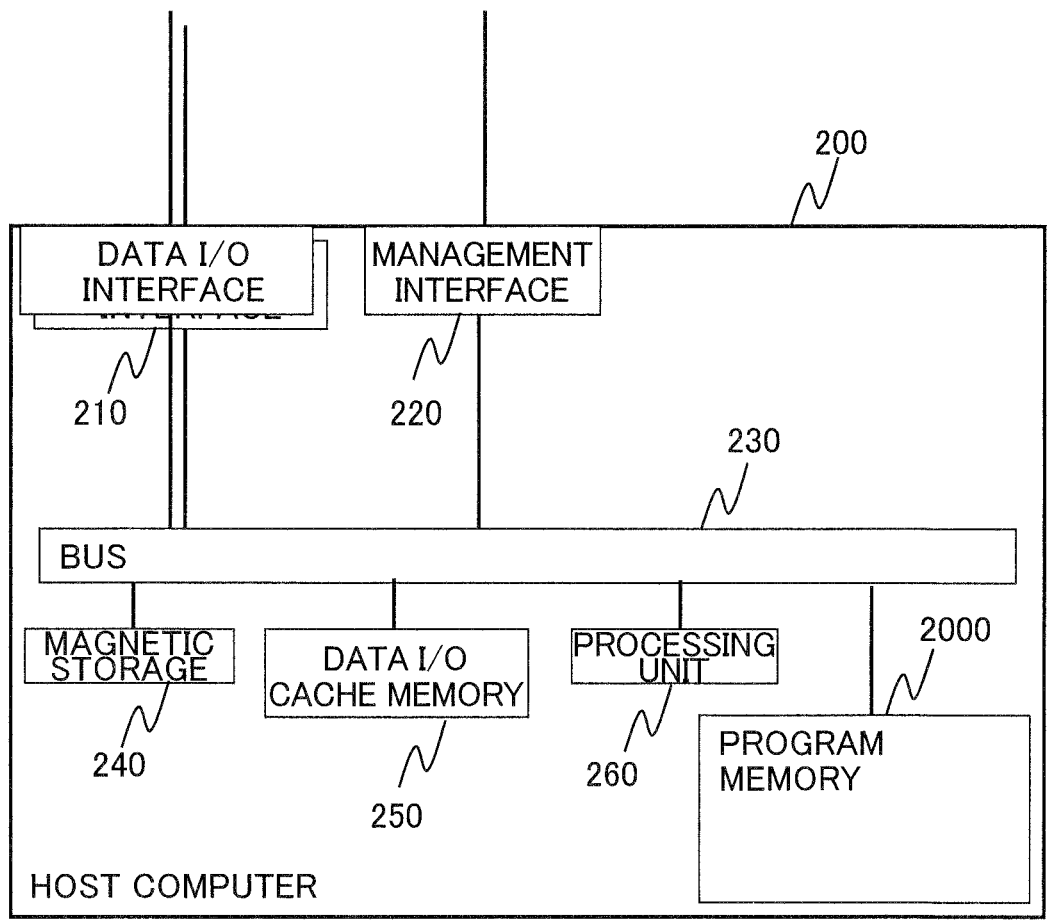
FIG. 4 is a diagram showing an example of a physical configuration of a host computer 200.

FIG. 4 shows an example of the physical configuration of the host computer 200. As shown in FIG. 4, the host computer 200 includes: a data I/O interface 210 for coupling to the data I/O network 800 and performing data input/output; a management interface 220 for inputting and outputting management information; a processing unit 260 equivalent to a CPU, which performs various arithmetic operations; a magnetic storage 240 that retains basic software such as an operating system; a program memory 2000 that is a storage space for accumulating programs required for operations of the host computer 200; and a data I/O cache memory 250 implemented by a volatile memory or the like for speeding up data input/output. As shown in FIG. 4, these components are communicatively coupled to each other via a communication bus 230.

The program memory 2000 is a memory space implemented by a magnetic storage or a volatile/non-volatile semiconductor memory and retains a basic program and information required for operations of the host computer 200. The program memory 2000 stores therein a business application program such as a database or an accounting program for generating/updating information to be stored in a storage unit, for example.

Figure 5:
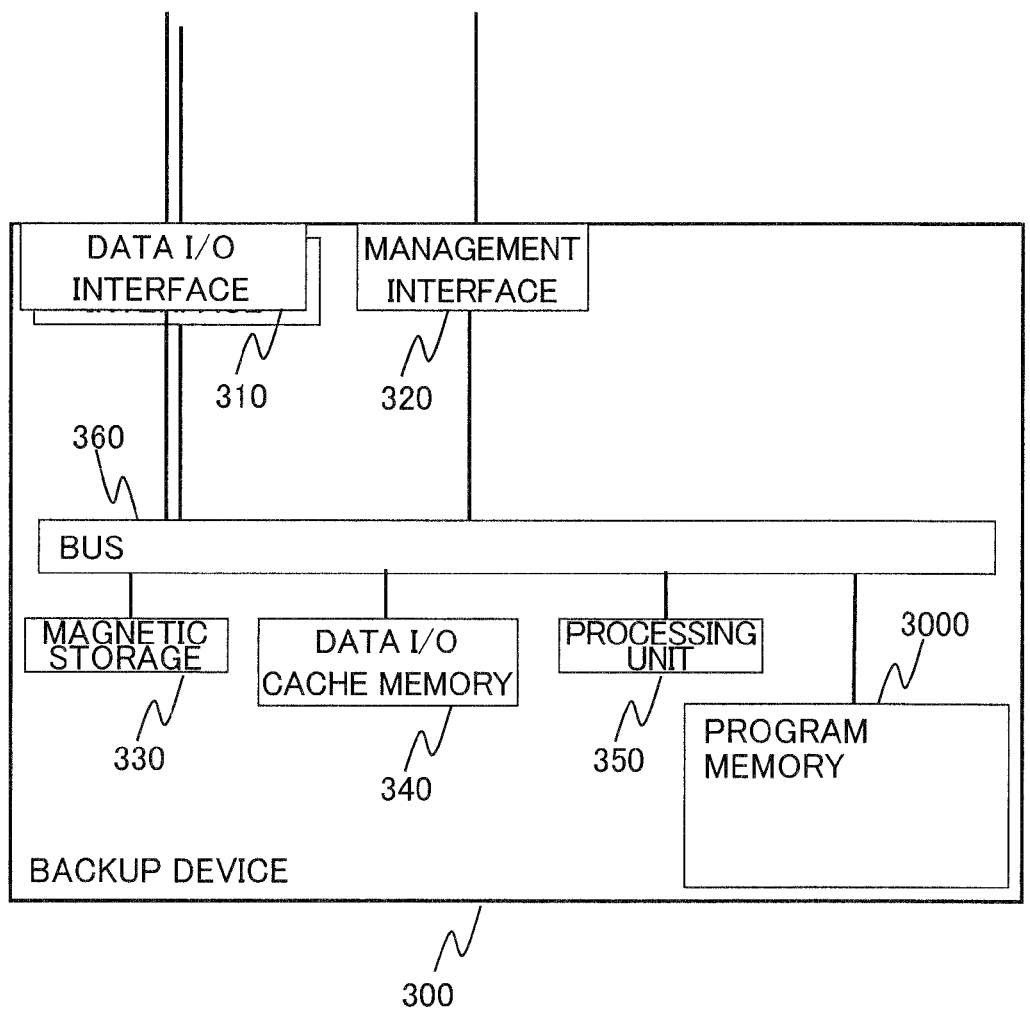
FIG. 5 is a diagram showing an example of a physical configuration of a backup device 300.

FIG. 5 shows an example of the physical configuration of the backup device 300. As shown in FIG. 5, the backup device 300 includes: a data I/O interface 310 for coupling to the data I/O network 800 and performing data input/output; a management interface 320 for inputting and outputting management information; a magnetic storage 330 that retains basic software such as an operating system; a processing unit 350 equivalent to a CPU, which performs various types of computing; a data I/O cache memory 340 implemented by a volatile memory or the like for speeding up data input/output; and a program memory 3000 that is a storage space for accumulating programs required for operations of the backup device 300. As shown in FIG. 5, these components are communicatively coupled to each other via a communication bus 360.

The program memory 3000 is a memory space implemented by a magnetic storage or a volatile/non-volatile semiconductor memory and retains a basic program and information required for operating the backup device 300. The program memory 3000 stores a backup program or the like therein, for example.

Figure 6:
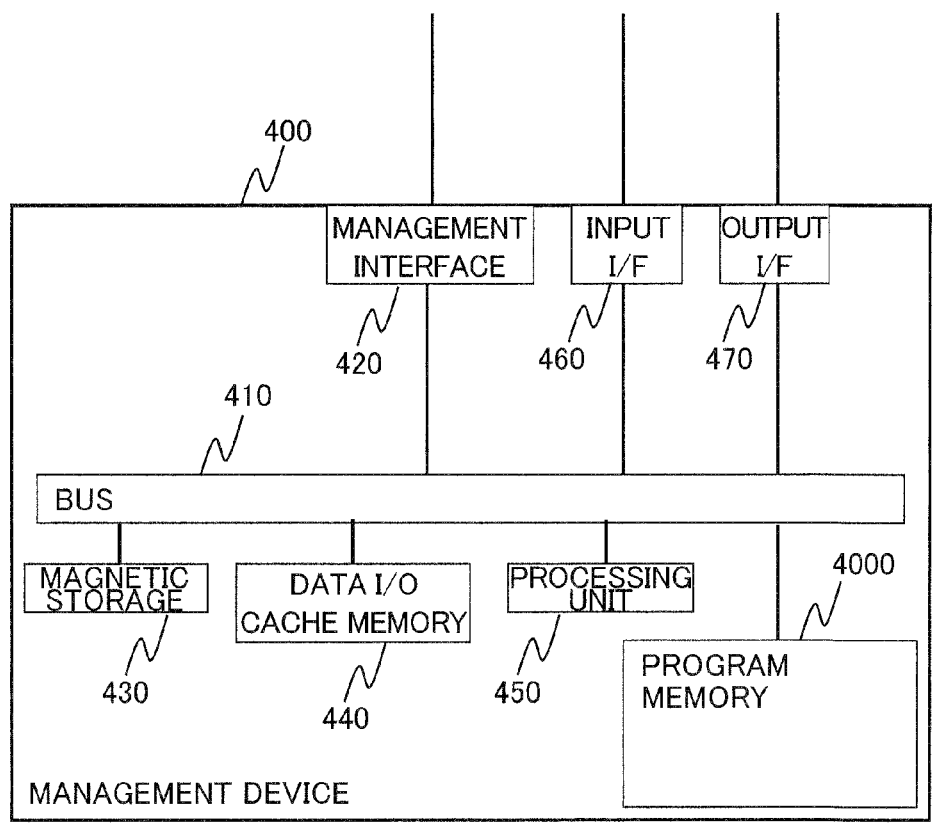
FIG. 6 is a diagram showing an example of a physical configuration of a management device 400.

FIG. 6 shows an example of the physical configuration of the management device 400. As shown in FIG. 6, the management device 400 includes: a management interface 420 for coupling to the management network 700 to input and output management information; an input interface 460 such as a keyboard or a mouse for a user to input information; an output interface 470 such as a general purpose display for outputting information to the user; a magnetic storage 430 that retains basic software such as an operating system; a processing unit 450 equivalent to a CPU, which performs various types of computing; a data I/O cache memory 440 implemented by a volatile memory or the like for speeding up data input/output; and a program memory 4000 that is a storage space for accumulating programs required for operations of the management device 400. As shown in FIG. 6, these components are configured to be communicatively coupled to each other via a communication bus 410.

<Continuous Data Protection Function>

In the information system 1, a continuous data protection (CDP) system is implemented. Continuous data protection monitors, at all times, writing of data to the storage devices 100 performed by the host computer 200 and manages the history of the writing of the data. Then, at the time of a restore, continuous data protection restores the data stored in the storage device 100 to a state at a given point in the past by using the aforementioned history. More specifically, a copy of the volume of the storage device 100 to which the business application or the like of the host computer 200 accesses (hereinafter, referred to as a "production volume") at a certain point in the past is managed in another volume (hereinafter, this volume is referred to as a "base volume"). In addition, the aforementioned history is managed in yet another volume (hereinafter, referred to as a "differential volume"). Then, the contents of the volume are restored to those at a given point in the past by reflecting the contents of the differential volume into the base volume. Hereinafter, backup data that is stored in the base volume and that becomes the base of restore is referred to as base data, and update differential data that is stored in the differential volume is referred to as differential data.

<Thin Provisioning>

A so-called thin provisioning system is introduced into the local site 10 and the remote site 20. In thin provisioning, a virtual-like volume (hereinafter, referred to as a "virtual volume") is allocated to the host computer 200. In response to a write request for data transmitted from the host computer 200, an actual storage area in a predetermined allocation unit (hereinafter, this unit is referred to as a "page") is dynamically allocated from a resource pool by the storage device 100. According to thin provisioning, the resource pool can be formed of a small capacity as compared with the virtual volume, so that the usability of the physical storage resource of the magnetic storage 140 or the like improves. In addition, expansion or reduction of the real volume to the resource pool can be performed independently from the host computer 200, so that simplification of the operation and a reduction in the management load can be achieved. It is to be noted that, in the case that the thin provisioning is not introduced into the local site 10, a physical capacity of the second volume required for operation on the thin provisioning at the remote site 20 can be calculated through analysis of the base volume and the differential volume.

=Details of Functions and Data=

Figure 7:
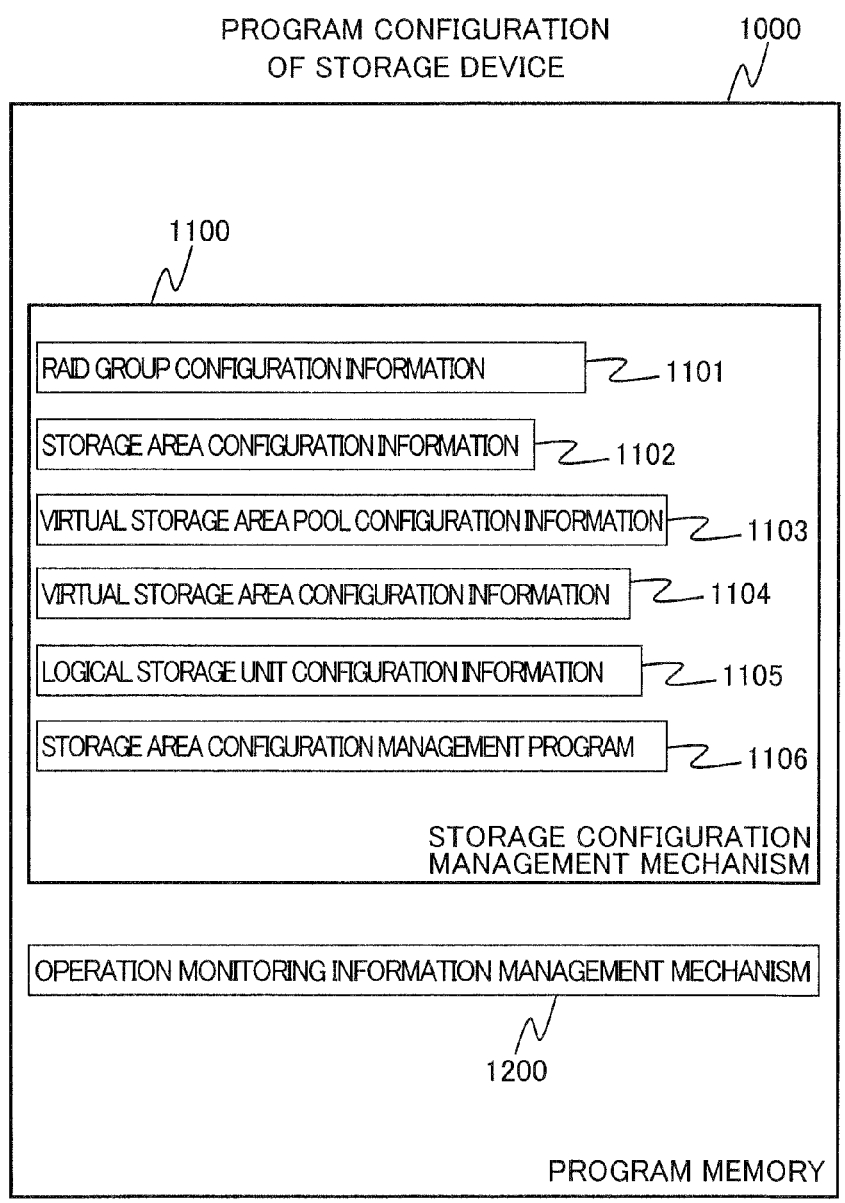
FIG. 7 is a diagram showing a program and information (data) to be stored in a program memory 1000 of the storage device 100.

FIG. 7 shows a program and information (data) stored in the program memory 1000 of the storage device 100. As shown in FIG. 7, a program and information that form each mechanism of a storage configuration management mechanism 1100 and an operation monitoring information management mechanism 1200 are stored in the program memory 1000. The storage configuration management mechanism 1100 manages a storage resource provided to the host computer 200 by the storage device 100. The operation monitoring information management mechanism 1200 monitors operation states of the storage units.

As shown in FIG. 7, the storage configuration management mechanism 1100 includes RAID group configuration information 1101, storage area configuration information 1102, virtual storage area pool configuration information 1103, virtual storage area configuration information 1104, logical storage unit configuration information 1105, and a storage area configuration management program 1106.

The RAID group configuration information 1101 shows a configuration of the RAID group formed of a set of the magnetic storages 140. The storage area configuration information 1102 shows a configuration of storage areas each being a unit of the storage resource, obtained by logically dividing the RAID group. The virtual storage area pool configuration information 1103 shows a configuration of a virtual storage area pool formed of a set of storage areas. The virtual storage area configuration information 1104 shows a configuration of virtual storage areas each being a unit of the storage resource, obtained by dividing the virtual storage area pool. The logical storage unit configuration information 1105 shows a configuration of logical storage units each being a unit of the storage resource provided to the host computer 200. The storage area configuration management program 1106 performs management and/or control for providing a storage area to the host computer 200, on the basis of each of the aforementioned pieces of the configuration information.

Figure 8:
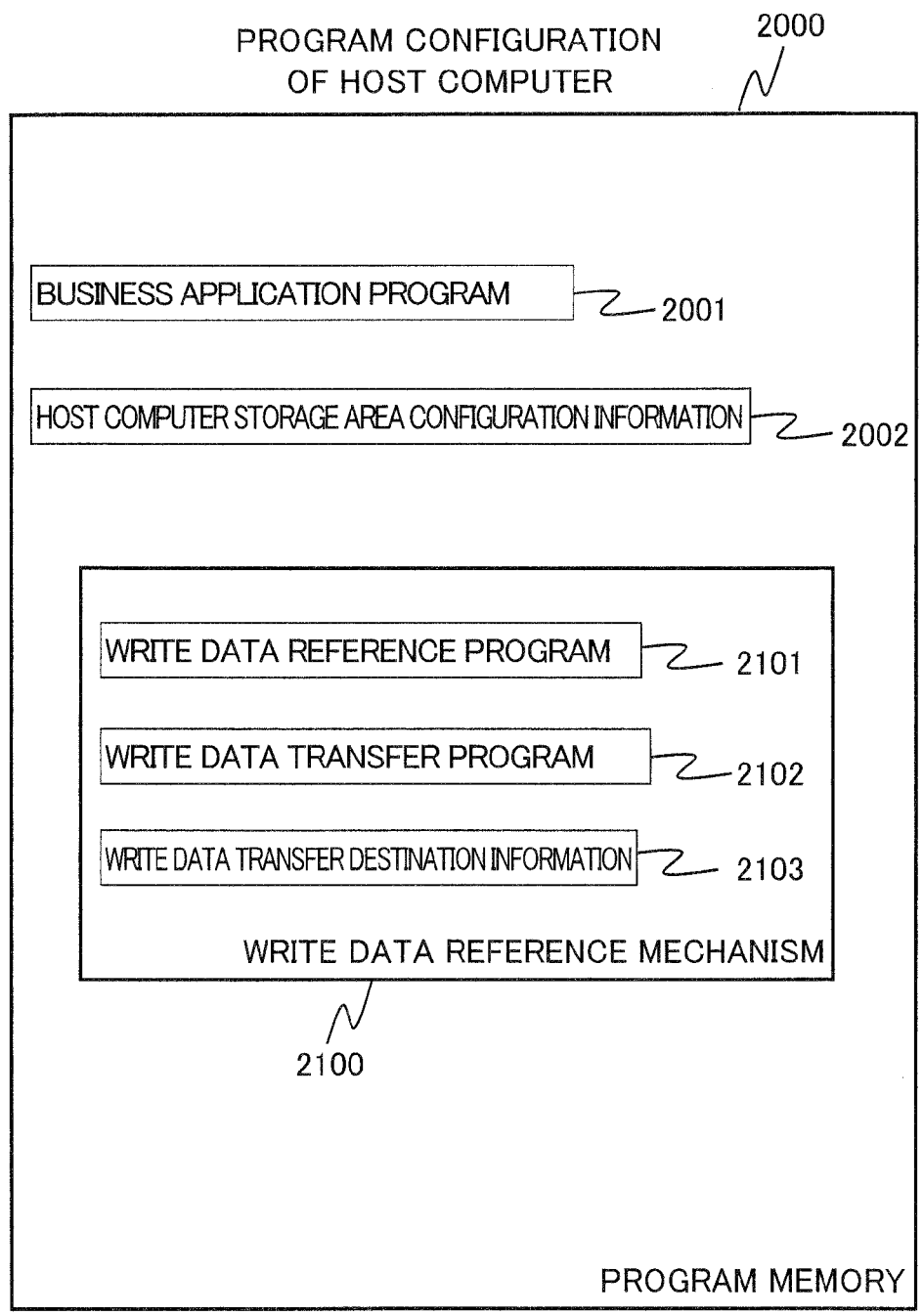
FIG. 8 is a diagram showing programs and information (data) to be stored in a program memory 2000 of the host computer 200.

FIG. 8 shows programs and information (data) stored in the program memory 2000 of the host computer 200. As shown in FIG. 8, the program memory 2000 stores, therein, a business application program 2001, host computer storage area configuration information 2002, programs and information forming a write data reference mechanism 2100.

The business application program 2001 is a program for implementing an application such as a database management system or an accounting program. The business application program 2001 performs data input/output to and from a storage area on the basis of the host computer storage area configuration information 2002. The host computer storage area configuration information 2002 is information related to the host computer storage area, which is a volume formed by mounting a logical storage unit onto the host computer 200.

The write data reference mechanism 2100 includes programs and information for implementing a function to detect that data has been written by the business application program 2001 or to transfer or the like write data. The write data reference mechanism 2100 is a part of a mechanism for implementing the aforementioned continuous data protection function. As shown in FIG. 8, the write data reference mechanism 2100 includes a write data reference program 2101, a write data transfer program 2102 and write data transfer destination information 2103. The write data reference program 2101 among the above is a program for implementing a function to detect data written by the business application program 2001. The write data transfer program 2102 is a program for implementing a function to transfer, on the basis of the write data transfer destination information 2103, the write data detected by the write data reference program 2101. The write data transfer destination information 2103 includes a transfer destination address of write data to the host computer storage area.

Figure 9:
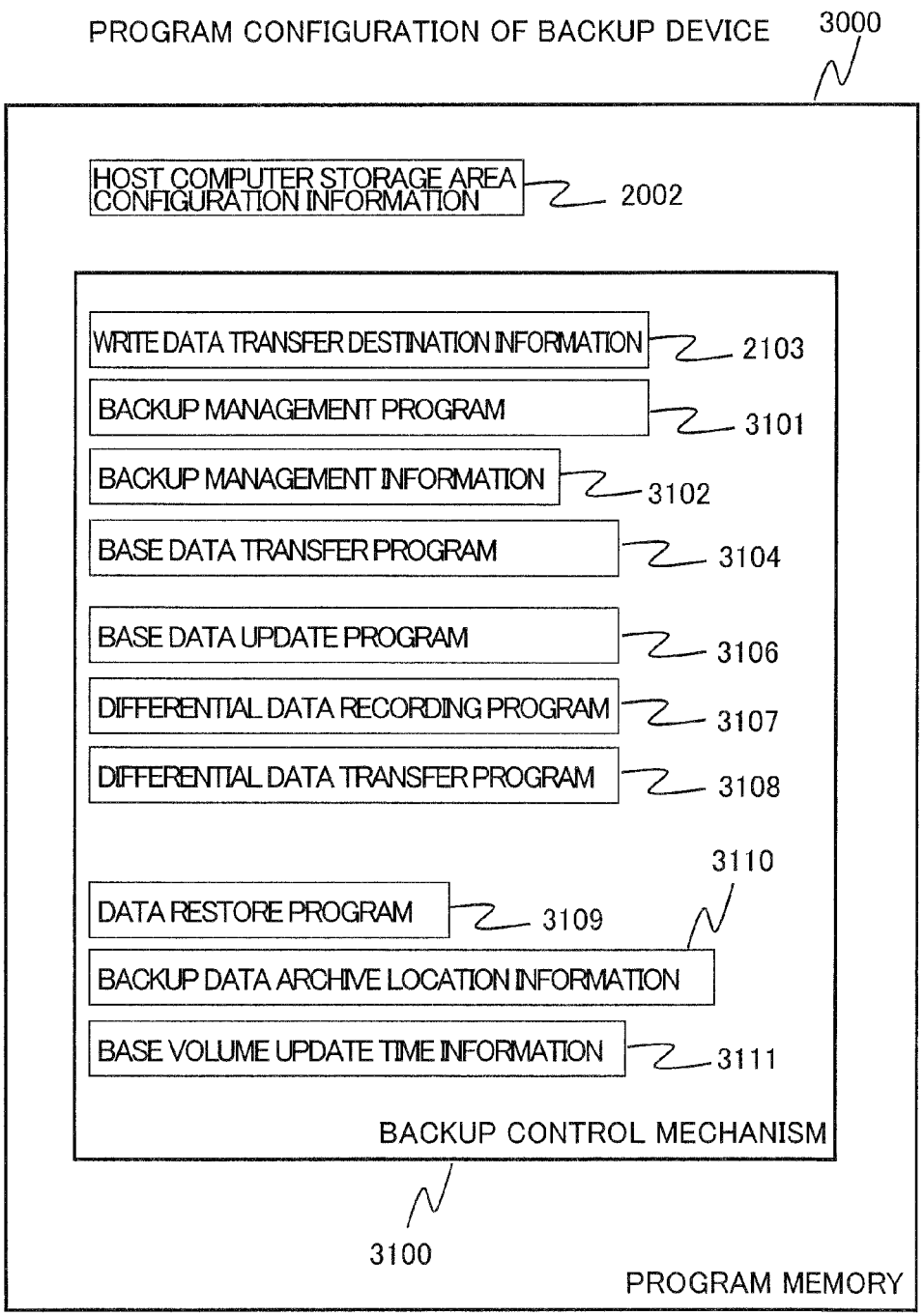
FIG. 9 is a diagram showing programs and information (data) to be stored in a program memory 3000 of the backup device 300.

FIG. 9 shows programs and information (data) stored in the program memory 3000 of the backup device 300. As shown in FIG. 9, programs and information forming the host computer storage area configuration information 2002 and a backup control mechanism 3100 are stored in the program memory 3000. The host computer storage area configuration information 2002 herein is the same as that described in FIG. 8. The backup control mechanism 3100 includes programs and information for implementing a function to copy and record, to transfer or the like of data of the business application program 2001 in the backup device 300.

The backup control mechanism 3100 includes write data transfer destination information 2103, a backup management program 3101, backup management information 3102, a base data transfer program 3104, a base data update program 3106, a differential data recording program 3107, a differential data transfer program 3108, a data restore program 3109, backup data archive location information 3110 and base volume update time information 3111.

The write data transfer destination information 2103 among the above is the same as that described in FIG. 8. The backup control mechanism 3100 is a part of the mechanism for implementing the aforementioned continuous data protection function. The backup management program 3101 is a program for implementing a function to perform management and control to copy, record and transfer of data on the basis of programs or information to be described later.

The backup management information 3102 is information on a consistency guarantee time that is a still point at which the consistency of backup data is guaranteed. At the time of a restore of data, the data is restored on the basis of this consistency guarantee time. The backup data archive location information 3110 is information on the archive destination of backup data of the data of the business application program 2001. The base data transfer program 3104 is a program for implementing a function to copy the aforementioned base data. For example, the initial copy of production data of the business application program 2001 is applicable to the base data that becomes the base of the restore.

The differential data recording program 3107 is a program for implementing a function to record differential data transferred from the write data reference mechanism 2100 of the host computer 200 every time the business application program 2001 writes data.

The base data update program 3106 is a program for implementing a function to reflect the differential data into the base data. This program is executed in a case where the capacity of the free differential volume is to be increased when the capacity of the differential volume runs short. In this case, the program updates the base volume by reflecting the differential data that has been recorded until that time into the base data.

The base volume update time information 3111 is information showing at which point of time the base data stored in the base volume is based on. Each of the base data transfer program 3104 and the base data update program 3106 updates the base volume update time information 3111 after the copying and updating processing of the base volume. The differential data transfer program 3108 is a program for implementing a function to transfer differential data from the local site 10 to the remote site 20. The data restore program 3109 is a program for implementing a function to restore backup data in the volume of the restore destination at the time of a restore.

Figure 10:
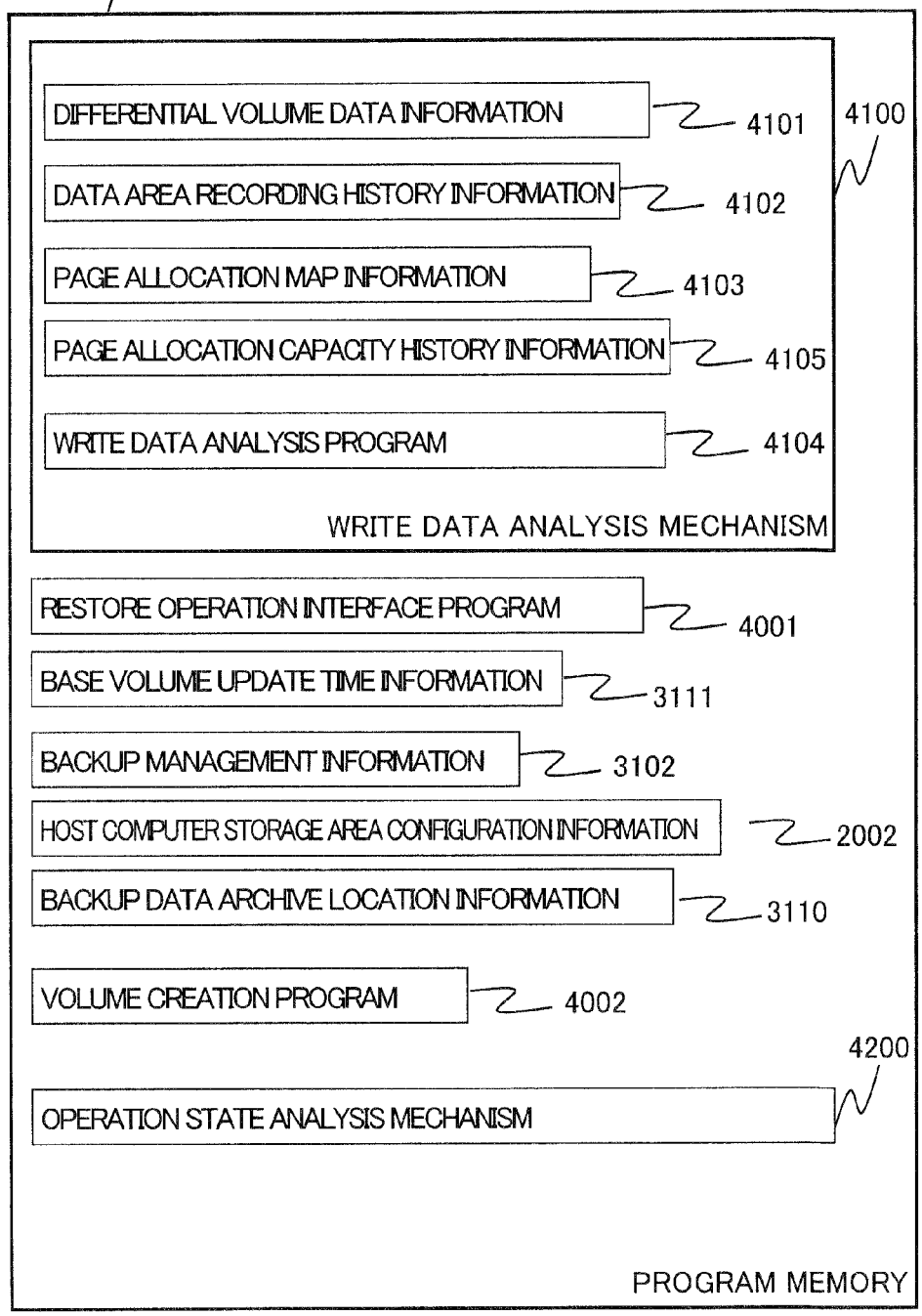
FIG. 10 is a diagram showing programs and information (data) to be stored in a program memory 4000 of the management device 400.

FIG. 10 shows programs and information (data) stored in the program memory 4000 of the management device 400. As shown in FIG. 10, the program memory 4000 stores therein: a program and information for implementing a write data analysis mechanism 4100; a restore operation interface program 4001; base volume update time information 3111; backup management information 3102; host computer storage area configuration information 2002; backup data archive location information 3110; a volume creation program 4002; and a program and information for implementing an operation state analysis mechanism 4200.

The write data analysis mechanism 4100 includes a program and information for checking backup data and analyzing the transition or tendency of the data written in the past. As shown in FIG. 10, the write data analysis mechanism 4100 includes differential volume data information 4101, data area recording history information 4102, page allocation map information 4103, page allocation capacity history information 4105 and a write data analysis program 4104.

The write data analysis program 4104 is a program for implementing a function to check, analyze and the like of the base data and the differential data on the basis of later described information. The differential volume data information 4101 includes meta information such as the update time of the data and the write address to the volume, and information on actual condition of the data for the differential data recorded in the differential volume. The data area recording history information 4102 is information related to a history of writing of data by the business application program 2001 to a new address, which can be acquired by the write data analysis program 4104 from the differential volume data information 4101 and the base volume. The page allocation map information 4103 is information related to the address map of a virtual volume generated by the write data analysis program 4104.

The write data analysis program 4104 finds, by checking the data area recording history information 4102 with the page allocation map information 4103, a condition of page allocation at the production volume in a case of a temporary operation in which the virtual volume is used supposedly at the production volume. Then, the write data analysis program 4104 stores the obtained result in the page allocation capacity history information 4105.

Descriptions of the base volume update time information 3111, the backup management information 3102, the host computer storage area configuration information 2002 and the backup data archive location information 3110 are omitted herein since the descriptions thereof have been given with regard to FIG. 7 or 8.

The restore operation interface program 4001 is a program for providing an interface for an operator to execute a restore. The volume creation program 4002 is a program for creating a volume in the storage device 100. The operation state analysis mechanism 4200 includes a program and information used when the operation state of the storage device 100 is analyzed.

Note that, synchronization processing is performed as needed for the information managed in the storage devices 100, the host computers 200, the backup devices 300 and the management devices 400 in the local site 10 and the remote site 20. The synchronization processing is performed for the information in each of the aforementioned devices via the management network 700, the data I/O network 800 or the inter-site communication network 30. In addition, each of the aforementioned devices can acquire information managed by the other devices from the other devices as needed via the management network 700, the data I/O network 800 or the inter-site communication network 30.

FIG. 11 shows an example of the RAID group configuration information 1101. As shown in the drawing, the RAID group configuration information 1101 includes at least one record having: RAID group identification information 11011 in which RAID group identification information that is identification information provided to each RAID group is set; and magnetic storage identification information 11012 in which magnetic storage identification information provided to each of the magnetic storages 140 is set. The items of the RAID group identification information 11011 and the magnetic storage identification information 11012 in the record are associated with each other.

FIG. 12 shows an example of the storage area configuration information 1102. As shown in FIG. 12, the storage area configuration information 1102 includes at least one record having storage area identification information 11021, and RAID group identification information 11022 in which the aforementioned RAID group identification information is set. In the storage area identification information 11021, storage area identification information that is an identifier provided to each storage area is set, the storage area being logically defined by using the storage area of the RAID group. The items of the storage area identification information 11021 and the RAID group identification information 11022 in the record are associated with each other.

FIG. 13 shows an example of the virtual storage area pool configuration information 1103. As shown in FIG. 13, the virtual storage area pool configuration information 1103 includes at least one record having: virtual storage area pool identification information 11031 in which virtual storage area pool identification information that is an identifier provided to each virtual storage area pool is set; and storage area identification information 11032 in which the aforementioned storage area identification information is set. The items of the virtual storage area pool identification information 11031 and the storage area identification information 11032 in the record are associated with each other.

FIG. 14 shows an example of the virtual storage area configuration information 1104. As shown in FIG. 14, the virtual storage area configuration information 1104 includes at least one record having virtual storage area pool identification information 11041 in which virtual storage area pool identification information is set, and virtual storage area identification information 11042. In the virtual storage area identification information 11042, virtual storage area identification information that is an identifier provided to each virtual recording area is set, the virtual recording area being a storage area configured by using a storage area of the virtual storage area pool. The items of the virtual storage area pool identification information 11041 and the virtual storage area identification information 11042 in the record are associated with each other.

Figure 15:
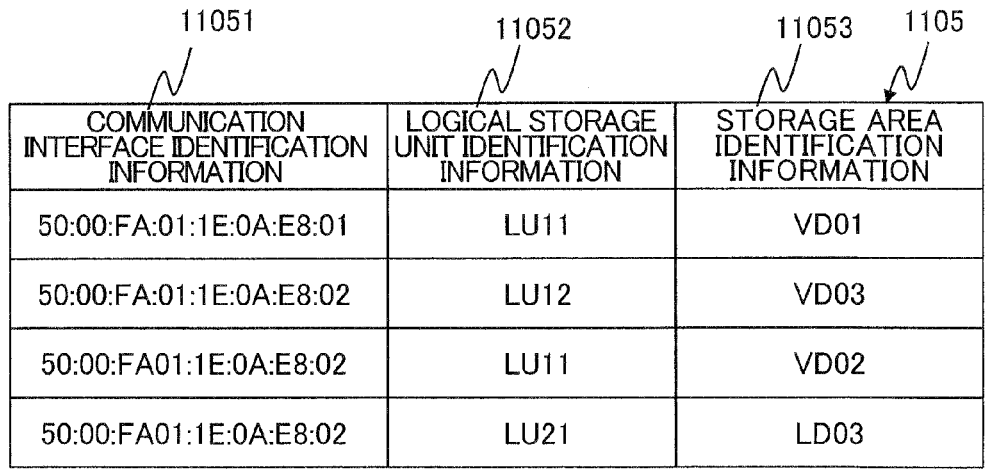
FIG. 15 is a diagram showing an example of logical storage unit configuration information 1105.

FIG. 15 shows an example of the logical storage unit configuration information 1105. As shown in FIG. 15, the logical storage unit configuration information 1105 includes at least one record having communication interface identification information 11051, logical storage unit identification information 11052, and storage area identification information 11053 in which the aforementioned storage area identification information is set. In the communication interface identification information 11051, an identifier provided to each of the data I/O interfaces 110 is set. In the logical storage unit identification information 11052, a logical storage unit identifier is set. In the logical storage unit identifier, an identifier provided to each logical storage unit to be described later is set. The items of the communication interface identification information 11051, the logical storage unit identification information 11052 and the storage area identification information 11053 in the record are associated with each other. The aforementioned logical storage unit is a unit of a storage resource accessible from the host computer 200 coupled to the storage device 100 and is equivalent to the volume mounted on a file system of the host computer 200.

Figure 16:
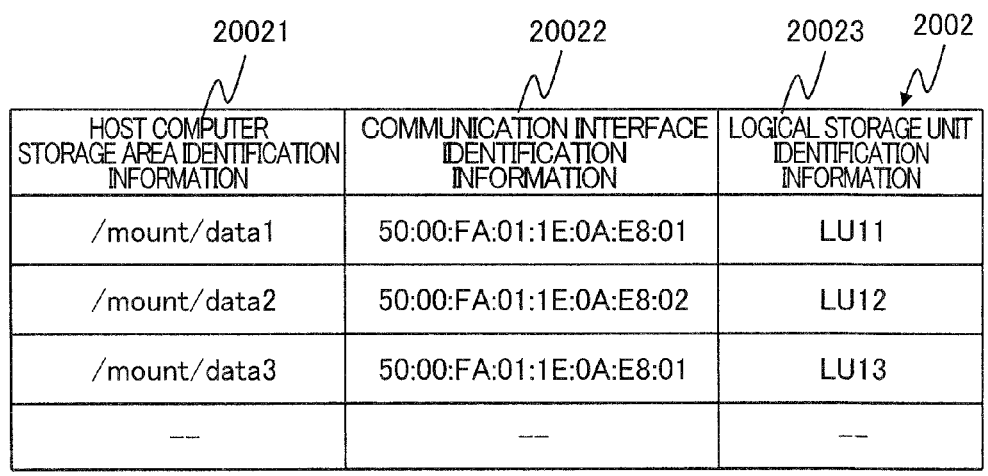
FIG. 16 is a diagram showing an example of host computer storage area configuration information 2002.

FIG. 16 shows an example of the host computer storage area configuration information 2002. As shown in FIG. 16, the host computer storage area configuration information 2002 includes at least one record having: host computer storage area identification information 20021 in which host computer storage area identification information that is the identification information of the storage area on the host computer side is set; communication interface identification information 20022 in which the aforementioned communication interface identification information is set; and logical storage unit identification information 20023 in which the aforementioned logical storage unit identifier is set. The items of the host computer storage area identification information 20021, the communication interface identification information 20022 and the logical storage unit identification information 20023 in the record are associated with each other. The host computer storage area is equivalent to a mount point when the logical storage unit is mounted on a file system of the host computer 200.

FIG. 17 shows an example of the write data transfer destination information 2103. As shown in FIG. 17, the write data transfer destination information 2103 includes at least one record having: host computer storage area identification information 21031 in which the aforementioned host computer storage area identification information is set; and transfer destination address information 21032 in which transfer destination address information is set, the transfer destination address information being a network address of a transfer destination device for the data written in the host computer storage area. The items of the host computer storage area identification information 21031 and the transfer destination address information 21032 in the record are associated with each other.

FIG. 18 shows an example of the backup data archive location information 3110. As shown in FIG. 18, the backup data archive location information 3110 includes at least one record having: communication interface identification information 31101 in which the aforementioned communication interface identification information is set; logical storage unit identification information 31102 in which the aforementioned logical storage unit identifier is set; and backup data archive location information 31103 in which backup data archive location is set, the backup data archive location being information indicating the archive destination of backup data. The items of the communication interface identification information 31101, the logical storage unit identification information 31102 and the backup data archive location information 31103 in the record are associated with each other. As shown in FIG. 18, the backup data archive location information 31103 includes: the items of base data archive location information 31103A in which base data archive location information that is information indicating the archive destination of base data is set; and differential data archive location information 31103B in which differential data archive location information that is information indicating the archive destination of differential data is set.

The data written by an application program is stored in a backup archive location recorded in the backup data archive location information 31103 in the backup device 300. In continuous data protection, a copy of the production volume at a point of time in the past, which is used by the host computer 200 for data input/output, is stored at a base data archive location recorded in the base data archive location information 31103A. In addition, in continuous data protection, for the data written by the host computer 200, which is transferred as needed, the differential data archive location recorded in the differential data archive location information 31103B becomes the recording destination.

Figure 19:
FIG. 19 is a diagram showing an example of base volume update time information 3111.

FIG. 19 shows an example of the base volume update time information 3111. As shown in FIG. 19, the base volume update time information 3111 includes at least one record having: base data archive location 31111 in which the aforementioned base data archive location information is set; and a base volume update time 31112 in which base volume update time information is set, the base volume update time information being time information indicating the time when the base data is initially copied or the base data is updated. The items of the base data archive location 31111 and the base volume update time 31112 in the record are associated with each other.

Figure 20:
FIG. 20 is a diagram showing an example of backup management information 3102.

FIG. 20 shows an example of the backup management information 3102. As shown in FIG. 20, the backup management information 3102 includes at least one record having: host computer storage area identification information 31021 in which the aforementioned host computer storage area identification information is set; and a consistency guarantee time 31022 in which a consistency guarantee time is set, the consistency guarantee time being the latest time information for which the consistency of the data recorded in the host computer storage area identification information is guaranteed. The items of the host computer storage area identification information 31021 and the consistency guarantee time 31022 in the record are associated with each other.

FIG. 21 shows an example of the differential volume data information 4101. The history of data writing in the volume is managed in the differential volume data information 4101. As shown in FIG. 21, the differential volume data information 4101 includes at least one record having: a time 41011 in which the time when data was written is set; communication interface identification information 41012 in which the aforementioned communication interface identification information is set; logical storage unit identification information 41016 in which the aforementioned logical storage unit identification information is set; a block address 41013 at which the data is written; data entity identification information 41014 in which data entity identification information that is an identifier provided to the written data is set; and data 41015 in which the written data is stored. The items of the aforementioned pieces of information in the record are associated with each other. As described above, the information indicating what data is written to what address in what volume at what time is managed in the differential volume data information 4101.

Figure 22:
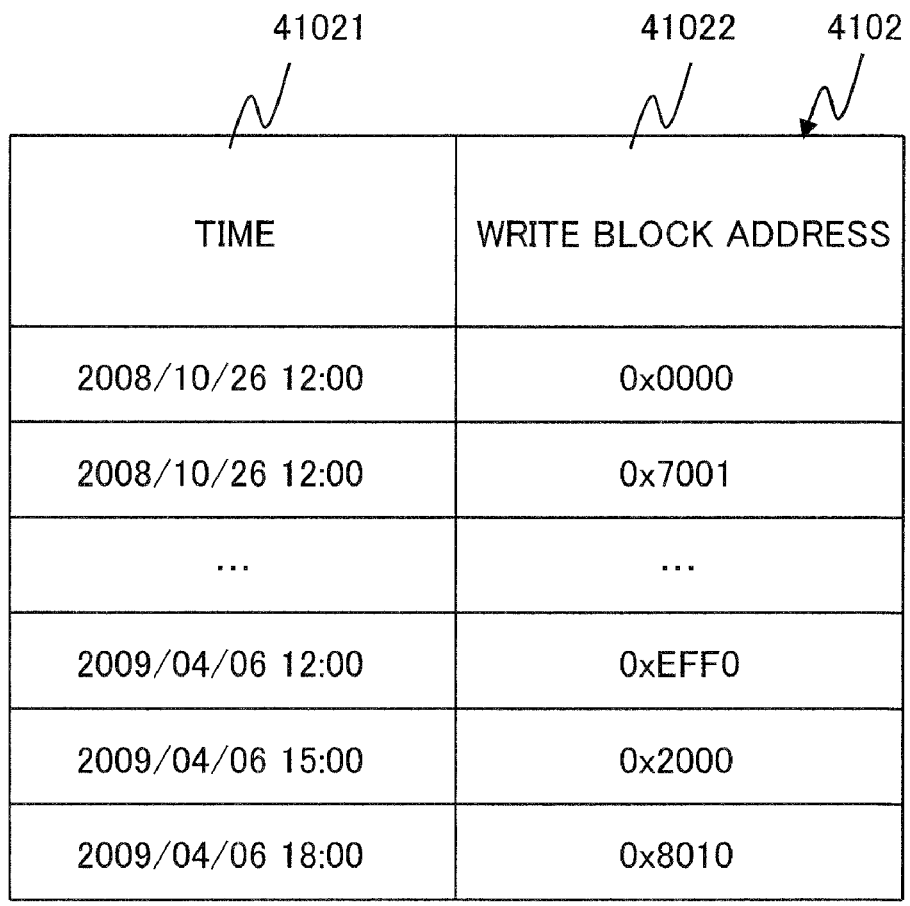
FIG. 22 is a diagram showing an example of data area recording history information 4102.

FIG. 22 shows an example of the data area recording history information 4102. The data area recording history information 4102 manages information that can be acquired when the write data analysis program 4104 of the management device 400 analyzes a scan result of the base volume and the differential volume data information 4101. As shown in FIG. 22, the data area recording history information 4102 includes at least one record having: a time 41021 in which the time when the data was written in the volume is set; and a write block address 41022 in which the block address of the destination of writing of the data is set. The items of the time 41021 and the write block address 41022 in the record are associated with each other.

FIG. 23 shows an example of the page allocation map information 4103. As shown in FIG. 23, in the page allocation map information 4103, information related to a page is managed. Note that, as described above, the page refers to a storage area dynamically allocated from the resource pool.

As shown in FIG. 23, the page allocation map information 4103 includes at least one record having: page identification information 41031 in which page identification information provided to each page is set; a page area 41036 in which information that specifies the area of the page on the volume is set; and a page allocation time 41035 in which a page allocation time that is the time when the page is allocated is set. The items of the page identification information 41031, the page area 41036 and the page allocation time 41035 in the record are associated with each other. As shown in FIG. 23, the page area 41036 includes the items of a page start block address 41032 and a page end block address 41033.

The page recorded in the page identification information 41031 is defined at a space of the page area 41036 from the page start block address 41032 to the page end block address 41033. As to the page for which a time is set in the page allocation time 41035, the time indicates that the data is written at this time. As to the page for which a time is not set in the page allocation time 41035, the page allocation time 41035 indicates that data is not written yet.

Figure 24:
FIG. 24 is a diagram showing an example of page allocation capacity history information 4105.

FIG. 24 shows an example of the page allocation capacity history information 4105. In the page allocation capacity history information 4105, a history of page allocation capacities is managed. As shown in FIG. 24, the page allocation capacity history information 4105 includes at least one recording having: a time 41051 in which the time when the page is allocated is set; and a page allocation capacity 41052 in which a page allocation capacity that is the capacity of the allocated page is set. The items of the time 41051 and the page allocation capacity 41052 in the record are associated with each other. The page allocation capacity history information 4105 shown in FIG. 24 indicates that data is recorded in a page area of 100 GB at 12:00 on Oct. 26, 2008. The page allocation capacity history information 4105 shown in FIG. 24 also indicates that data is recorded in a page area of 110 GB at 17:00 on Nov. 26, 2008.

=Description of Processing=

Hereinafter, a description will be given of processing performed in the information system 1 formed of the configuration described above.

<Backup Processing at the Time of Normal Operation>

A description will be given of backup processing during normal operation, first.

Figure 25:
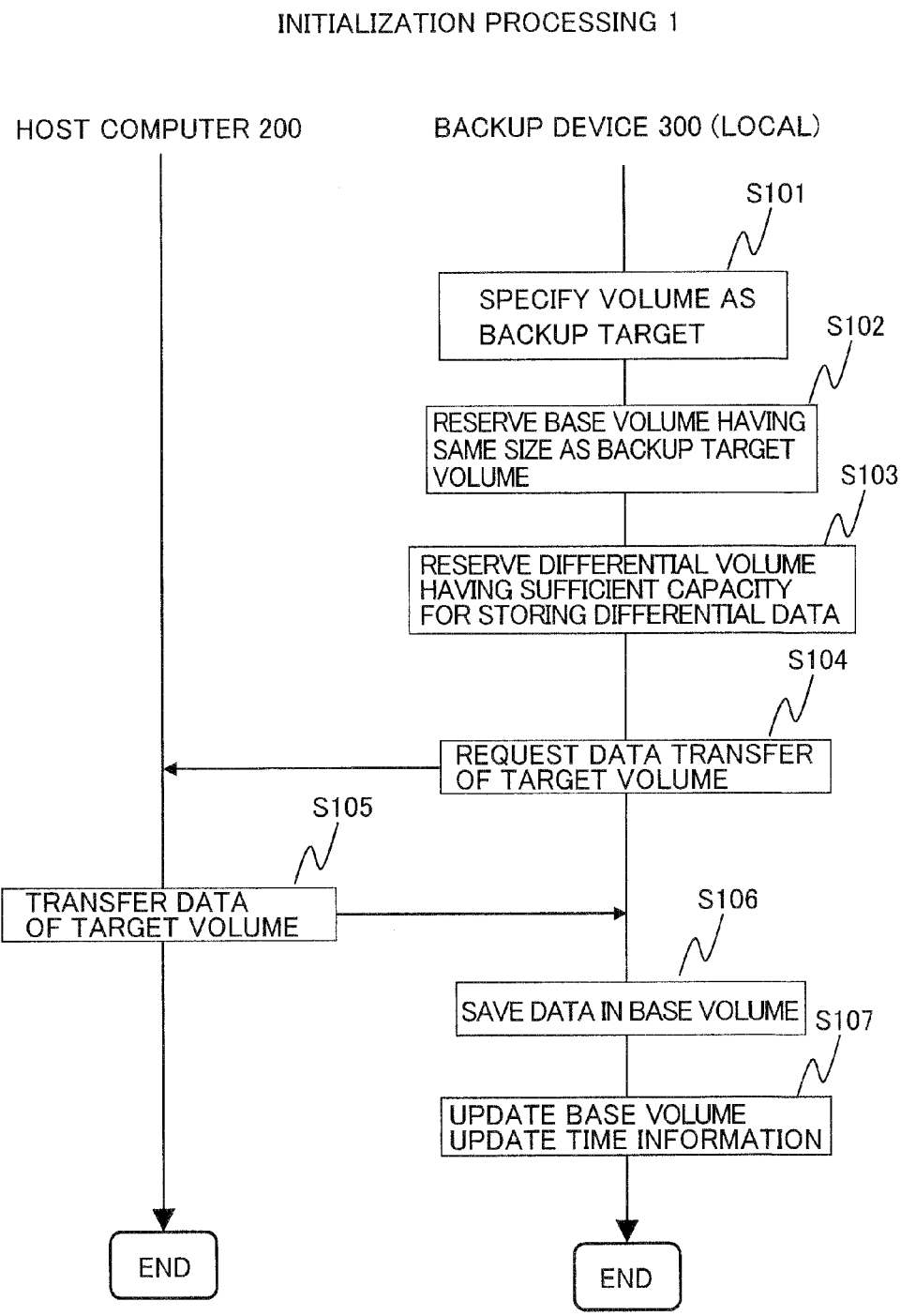
FIG. 25 is a flow chart describing initialization processing 1.

FIG. 25 is a flow chart describing processing (initialization processing 1) related to making a copy of data used by the business application or the like in the backup device 300 of the local site 10 and to the initialization for the aforementioned continuous data copy. Note that, in the processing shown in FIG. 25, the processing on the backup device 300 side of the local site 10 is implemented by mainly executing the backup management program 3101 with the backup device 300 of the local site 10.

Firstly, the backup device 300 of the local site 10 adds a record related to a storage area (volume) of the host computer 200 of the local site 10 to the backup data archive location information 3110, the storage area being the backup target (S101 to S103). Specifically, with reference to the host computer storage area configuration information 2002, the logical storage unit configuration information 1105 and the like, the backup device 300 of the local site 10 specifies the storage area of the host computer 200 that becomes the backup target, and the communication interface identification information corresponding to the storage area (S101); reserves a base volume having the same data size as that of the storage area that becomes the backup target (S102); reserves a differential volume having a sufficient data size for storing the differential data of the storage area that becomes the backup target (S103); generates a record corresponding to the result; and adds the record in the backup data archive location information 3110. Note that, the data size of the base volume or the differential volume can be estimated by using a well known technique.

Next, the backup device 300 of the local site 10 transmits a transfer request for the data stored in the storage area specified as the backup target, to the host computer 200 of the local site 10 via the management network 700 (S104). Upon receipt of the aforementioned transfer request, the host computer 200 of the local site 10 adds a record corresponding to the aforementioned transfer request in its own write data transfer destination information 2103. The host computer 200 of the local site 10 then transfers the data corresponding to the aforementioned transfer request to the backup device 300 of the local site 10 via the data I/O network 800 (S105). Note that, the processing related to this transfer is implemented by executing the aforementioned write data transfer program 2102 by the host computer 200 of the local site 10.

Upon receipt of the data transferred from the host computer 200 of the local site 10, the backup device 300 of the local site 10 stores the data in the base volume reserved in the processing in S102 (S106). Note that, this storage processing is implemented by executing the aforementioned base data transfer program 3104 by the backup device 300 of the local site 10.

Figure 26:
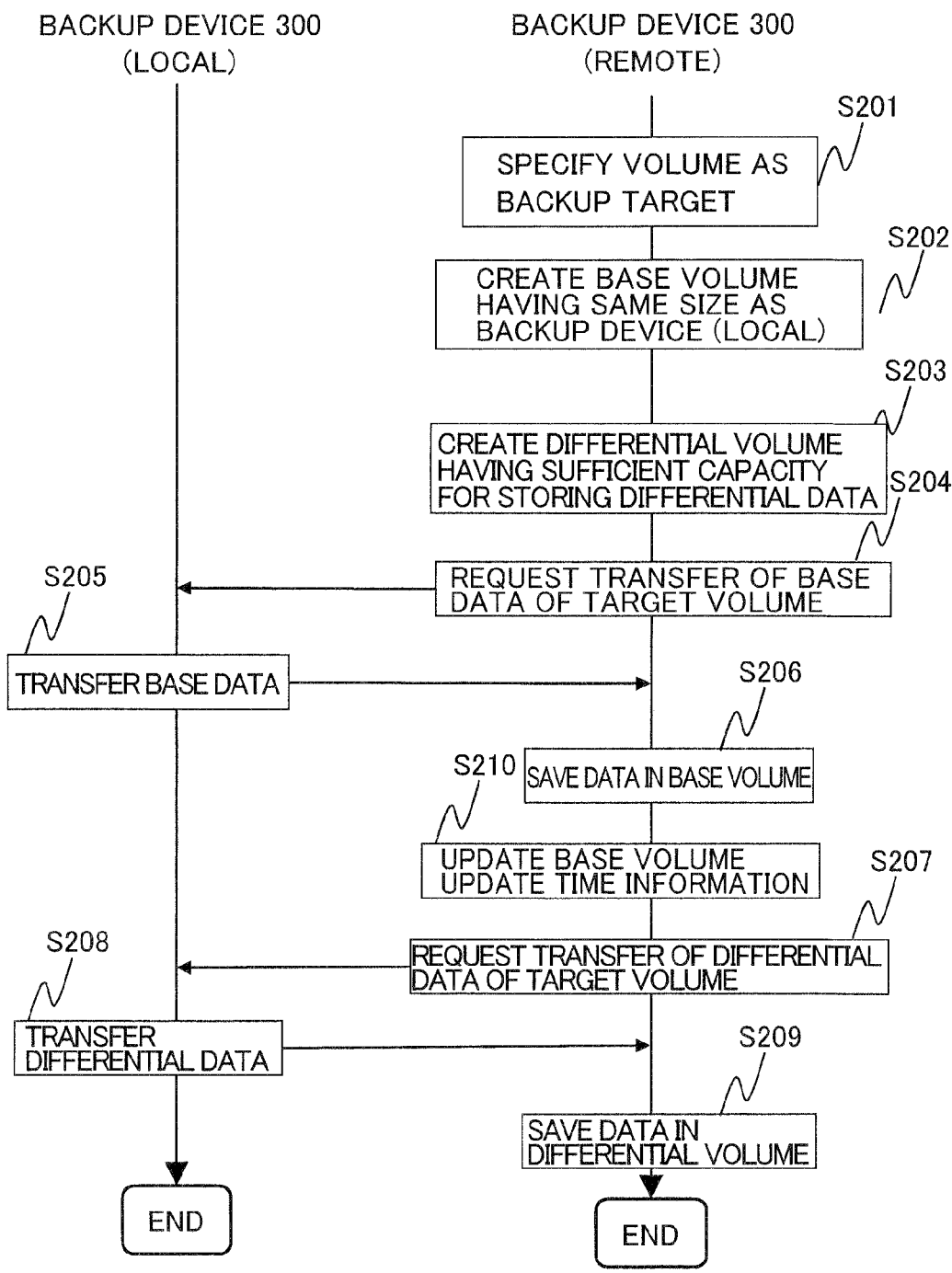
FIG. 26 is a flow chart describing initialization processing 2.

FIG. 26 is a flow chart describing processing (initialization processing 2) related to making a copy, in the backup device 300 of the remote site 20, of backup data existing in the backup device 300 of the local site 10 and to the initialization for the aforementioned continuous data copy. Note that, in the processing shown in FIG. 26, the processing on the backup device 300 of the local site 10 is implemented by mainly executing the backup management program 3101 by the backup device 300 of the local site 10. In addition, the processing on the backup device 300 of the remote site 20 is implemented by mainly executing the backup management program 3101 with the backup device 300 of the remote site 20.

Firstly, the backup device 300 of the remote site 20 specifies, as the backup target, the storage area of the host computer 200 that is recorded in the host computer storage area identification information 20021 and adds a record related to the specified storage area in its own backup data archive location information 3110 (S201 to S203). Specifically, the backup device 300 of the remote site 20 acquires the contents of the aforementioned record from the backup device 300 of the local site 10 via the inter-site communication network 30 and adds the record based on the acquired contents in the backup data archive location information 3110. The backup device 300 of the remote site 20 then reserves a base volume and a differential volume of the data size corresponding to the acquired contents (S202 to S203).

Next, the backup device 300 of the remote site 20 transmits a transfer request for the base data of the storage area that is specified as the backup target, to the backup device 300 of the local site 10 via the inter-site communication network 30 (S204).

Upon receipt of the aforementioned transfer request, the backup device 300 of the local site 10 adds a record corresponding to the aforementioned transfer request in its own write data transfer destination information 2103. The backup device 300 of the local site 10 then transfers the base data corresponding to the aforementioned transfer request to the backup device 300 of the remote site 20 via the inter-site communication network 30 (S205). Note that, the processing related to this transfer is implemented by executing the aforementioned base data transfer program 3104 by the backup device 300 of the local site 10.

Upon receipt of the base data transferred from the backup device 300 of the local site 10, the backup device 300 of the remote site 20 stores the data in the base volume reserved in the processing in S202 (S206). Note that, this storage processing is implemented by executing the aforementioned base data transfer program 3104 by the backup device 300 of the remote site 20.

Next, the backup device 300 of the remote site 20 transmits a transfer request for the differential data of the specified storage area that is specified as the backup target, to the backup device 300 of the local site 10 via the inter-site communication network 30 (S207).

Upon receipt of the aforementioned transfer request, the backup device 300 of the local site 10 transfers the differential data corresponding to the aforementioned transfer request to the backup device 300 of the remote site 20 via the inter-site communication network 30 (S208). Note that, the processing related to this transfer is implemented by executing the aforementioned differential data transfer program 3108 with the backup device 300 of the local site 10.

Upon receipt of the differential data transferred from the backup device 300 of the local site 10, the backup device 300 of the remote site 20 stores the differential data in the differential volume reserved in the processing in S203 (S209). Note that, this storage processing is implemented by executing the aforementioned differential data transfer program 3108 with the backup device 300 of the remote site 20.

Figure 27:
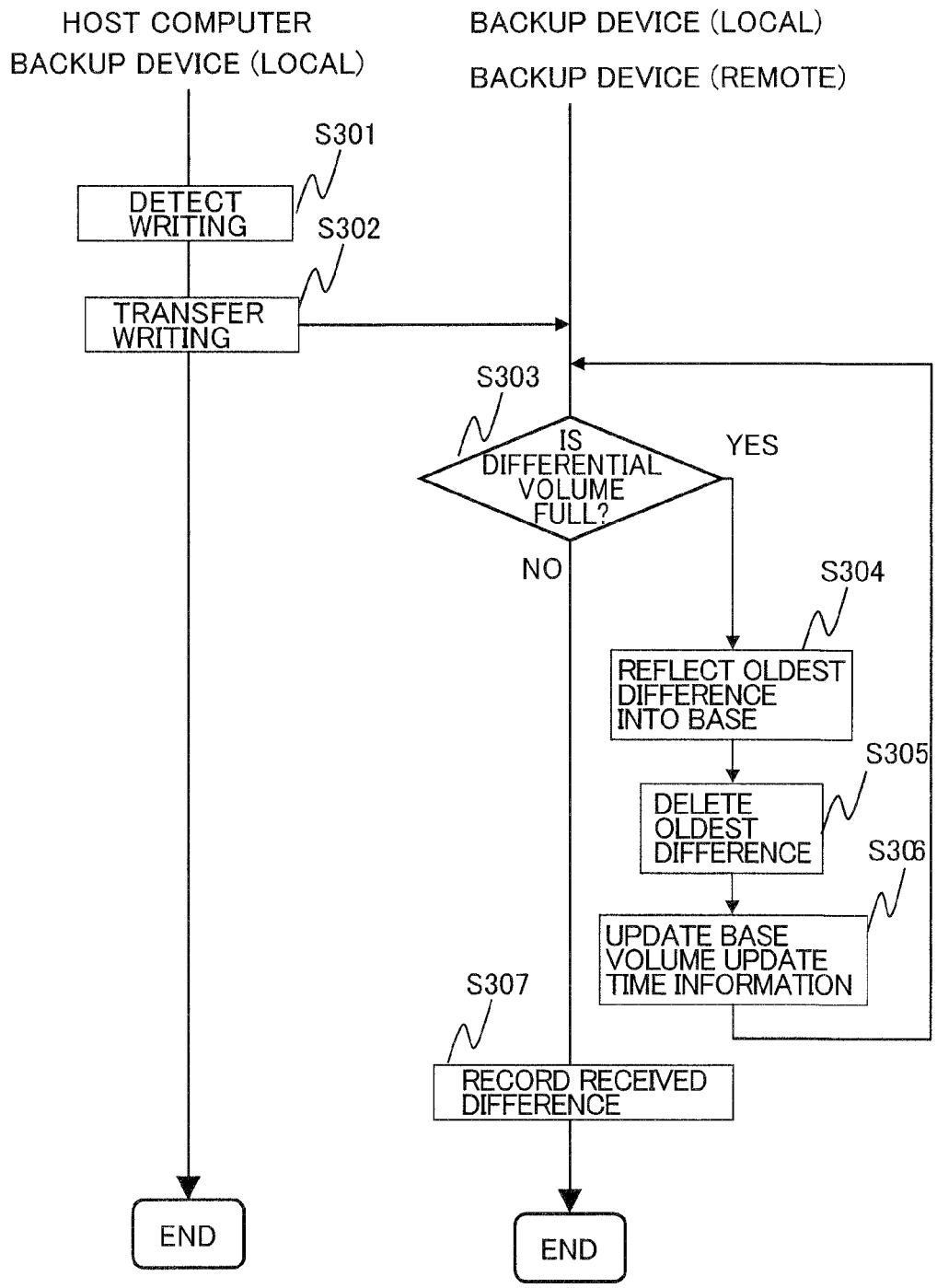
FIG. 27 is a flow chart describing processing to be performed in the information system 1.

FIG. 27 is a flowchart for describing processing performed in the information system 1 in a case where data is written by a business application from the host computer 200 in the storage area of the storage device 100 used by the business application in the local site 10.

When detecting that data is written in the host computer storage area identification information 20021 used by the business application program 2001 (S301), the host computer 200 of the local site 10 transfers write data to be written by this writing process, to the write data transfer destination specified by the write data transfer destination information 2103 (S302). Note that, the processing described above is implemented by executing the write data reference program 2101 by the host computer 200 of the local site 10.

Upon receipt of the aforementioned data transferred from the host computer 200 of the local site 10, the backup device 300 of the local site 10 determines whether or not a free space sufficient to store the data exists in the differential volume that becomes the storage destination of the data (S303). In a case where the free space sufficient to store the received data does not exist in the differential volume (S303: YES), the processing proceeds to S304. In a case where the free space sufficient to store the received data exists (S303: NO), the processing proceeds to S307.

The processing in S304 to S306 is processing for reserving the free space in the differential volume. Firstly, the backup device 300 of the local site 10 reflects the oldest differential data in the differential volume into the base volume (S304) and deletes the (old) differential data that is stored at the earliest time among the differential data stored in the differential volume (S305). The backup device 300 of the local site 10 then updates the base volume update time information 3111 (S306) and returns to S303. The processing in S303 to S306 is repeated until sufficient free space is reserved in the differential volume.

In S307, the backup device 300 of the local site 10 stores the aforementioned received data in the differential volume. Note that, the processing in S303 to S307 is implemented by executing the backup management program 3101 by the backup device 300 of the local site 10.

<Processing when Failure Occurs>

Next, a description will be given of a method of restoring data of the local site 10 in the remote site 20 when the local site 10 is struck by a disaster.

Figure 28:
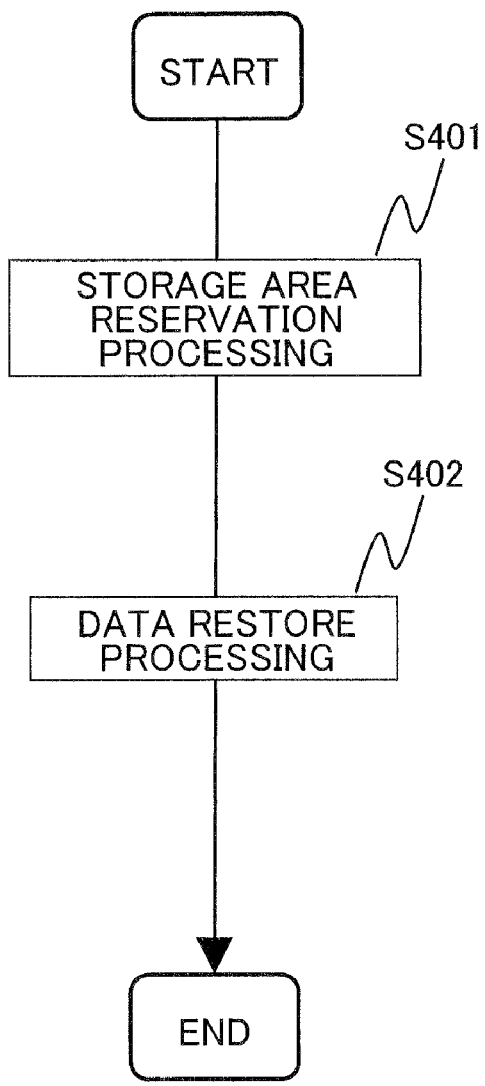
FIG. 28 is a flow chart describing a procedure used when data of the local site 10 is restored in the remote site 20.

FIG. 28 is a flow chart describing a procedure when the data of the local site 10 is restored in the remote site 20 in a case where the local site 10 is struck by a disaster. For the restore, a storage area (volume) that becomes the restore destination of the data is reserved first in the remote site 20 (hereinafter, referred to as storage area reservation processing (S401)). Then, the data in the local site 10 is restored in the reserved storage area (hereinafter, referred to as data restore processing (S402)).

Figure 29:
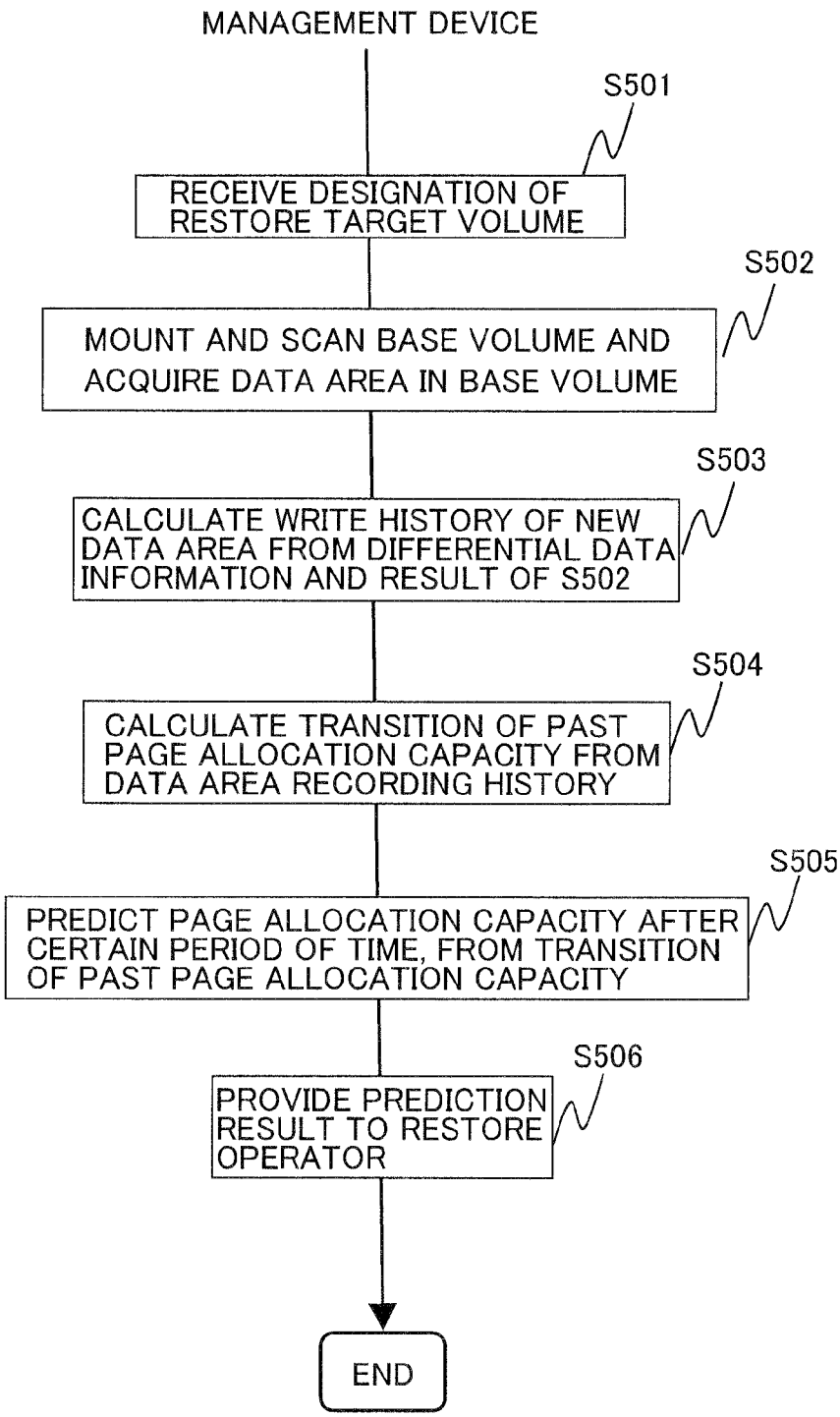
FIG. 29 is a flow chart describing restore-destination volume capacity prediction processing.

FIG. 29 is a flow chart describing a summary of processing related to the storage area reservation processing (S401) (hereinafter, referred to as restore-destination volume capacity prediction processing). Note that, the processing shown in FIG. 29 is implemented by executing the restore operation interface program 4001 or the write data analysis program 4104 by the management device 400.

Firstly, the management device 400 receives the designation of a storage area (volume) that becomes the restore target from the operator (S501). Next, the management device 400 mounts the base volume corresponding to the restore target volume on the management device 400 and then acquires the write start block address of the storage area in which the base data is stored in the base volume (S502). Then, the management device 400 reflects the write start block address into the write block address 41022 of the data area recording history information 4102. More specifically, on the basis of the contents of the differential volume data information 4101 and the data area of the base data acquired in S502, the management device 400 generates a write history of the area in which data is newly recorded by the business application program 2001 and then reflects the result thereof into the data area recording history information 4102. In addition, the management device 400 acquires, from the base volume update time information 3111, the base volume update time 31112 corresponding to the aforementioned write start block address acquired at this time. The management device 400 then associates the acquired time with the aforementioned write start block address and reflects the time into the time 41021 of the data area recording history information 4102 (S503).

Next, the management device 400 converts the writing to the data area recorded in the data area recording history information 4102 into the page of the virtual volume and calculates the transition of the page consumption capacity in the past (S504).

Figure 30:
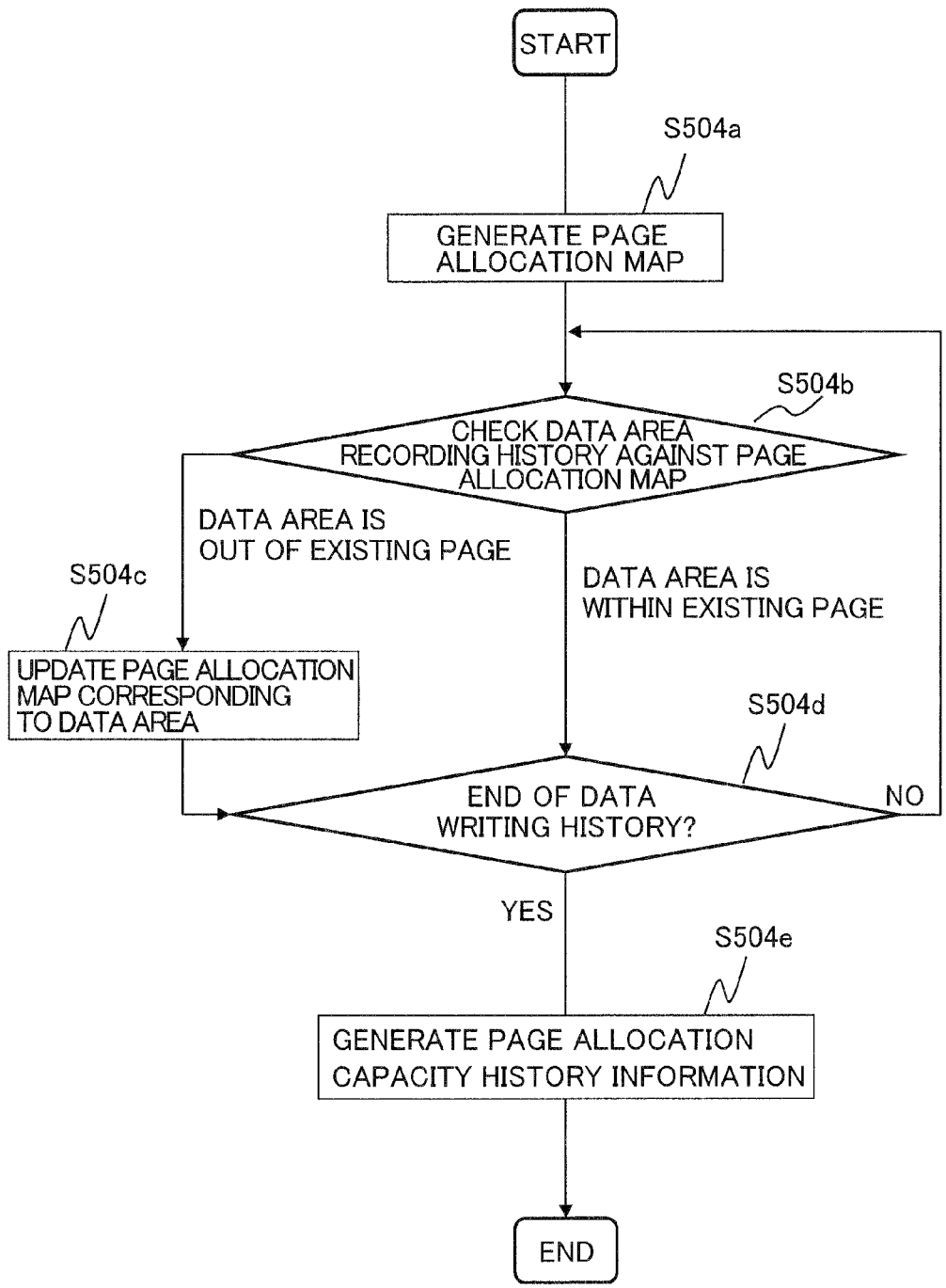
FIG. 30 is a flow chart describing processing in S504 in FIG. 29.

FIG. 30 is a flow chart describing the processing in S504. This processing is implemented by executing the write data analysis program 4104 by the management device 400.

Firstly, the management device 400 generates the page allocation map information 4103 of the virtual volume having the same address space as that of the volume of the backup target (S504a). Note that, the content of the page allocation time 41035 of the page allocation map information 4103 is not set at this point of time.

Next, the management device 400 acquires the records of the data area recording history information 4102 in the order of time series and checks the write block address 41022 of each of the acquired records against the block address of the page allocation map information 4103 (S504b). When a time is not yet set in the page allocation time 41035 of the page allocation map information 4103 corresponding to the write block address 41022, as a result of the checking (S504b: data area is out of the existing page), the management device 400 sets a time in the page allocation time 41035 corresponding to the write block address 41022 (S504c). Thereafter, the processing proceeds to S504d.

On the other hand, when a time is already set in the page allocation time 41035 of the page allocation map information 4103 corresponding to the write block address 41022 (S504b: data area is within the existing page), the processing proceeds to S504d.

In S504d, the management device 400 determines whether or not the processing has been already performed for all of the records of the data area recording history information 4102, and if not (S504d: NO), the processing proceeds to S504b and repeats the same processing for the next record. On the other hand, if the processing has been already performed for all of the records (S504d: YES), the processing proceeds to S504e.

In S504e, the management device 400 generates the page allocation capacity history information on the basis of the page allocation map information 4103. The processing described above is the details of the processing in S504 in FIG. 29.

A description will be given of FIG. 29 again. In S505, the management device 400 finds a page allocation capacity to be required in the future by use of a statistical prediction method or the like from the transition of the page consumption capacity in the past, which is acquired in S504, and then performs the prediction of the capacity of the virtual volume. The prediction of the capacity can be carried out by such an operation as a least squares method. Further, an appropriate filter may be used in the prediction for eliminating singularity that may cause noises. Then, the management device 400 outputs the prediction result in the form of a graph or the like, for example, and provides the prediction result to the restore operator (S506).

Figure 31:
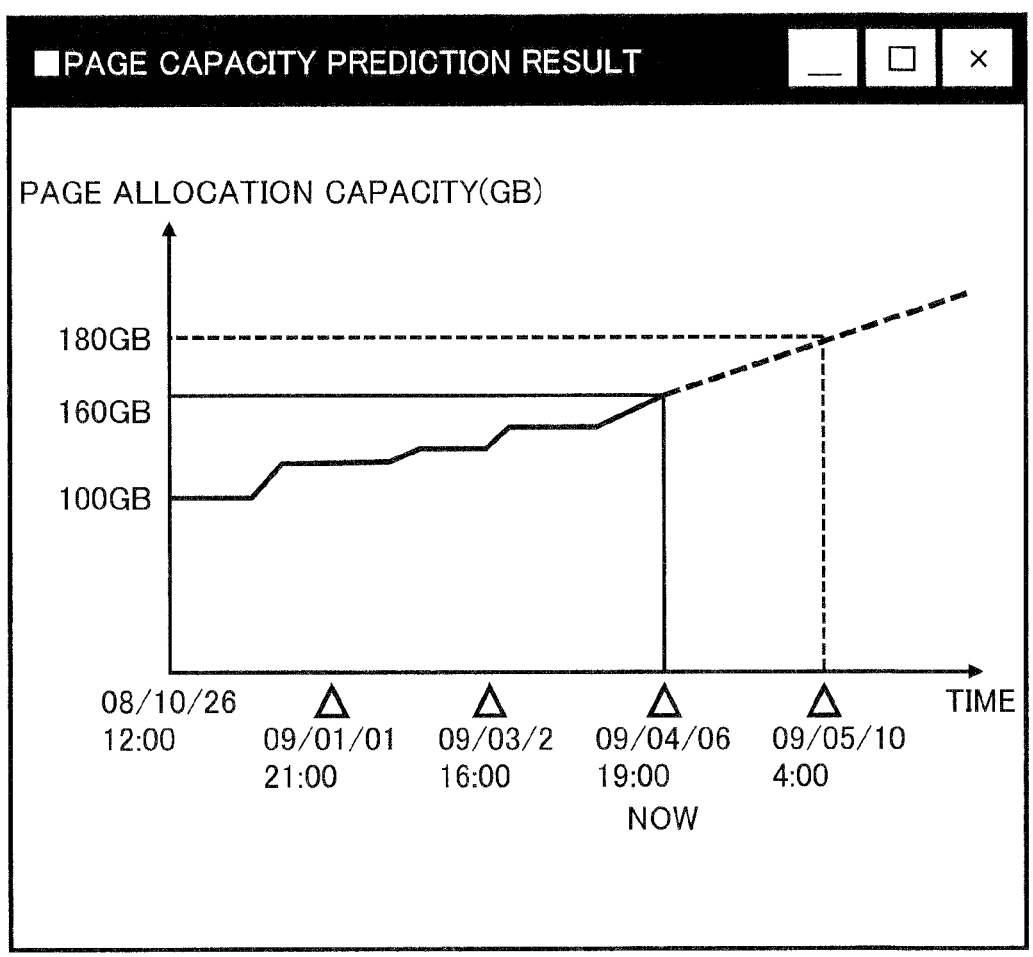
FIG. 31 is an example of a graph of a capacity prediction result to be submitted to the restore operator.

FIG. 31 is an example of the graph of the prediction result of the capacity to be provided to the restore operator in S506. The horizontal axis of the graph shows the time, and the vertical axis thereof shows the page allocation capacity. The history of the page allocation capacity in the past is shown by a solid line, and the page allocation capacity to be required in the future is shown by a dotted line. The restore operator creates, on the basis of the prediction result of the restore destination volume capacity provided in S506, a virtual volume that becomes the restore destination in the storage device 100 of the remote site 20 and then reserves the storage area. In this manner, since the prediction result is provided to the restore operator, the restore operator can properly estimate the capacity of the virtual volume, of the restore destination, to be required during a period until recovery of the local site 10. Thereby, the restore operator can prepare the appropriate capacity in the remote site 20 as the virtual volume. Thus, a reduction in the operation costs can be achieved.

<Data Restore Processing>

Next, a description will be given of the data restore processing (S402) shown in FIG. 28.

Figure 32:
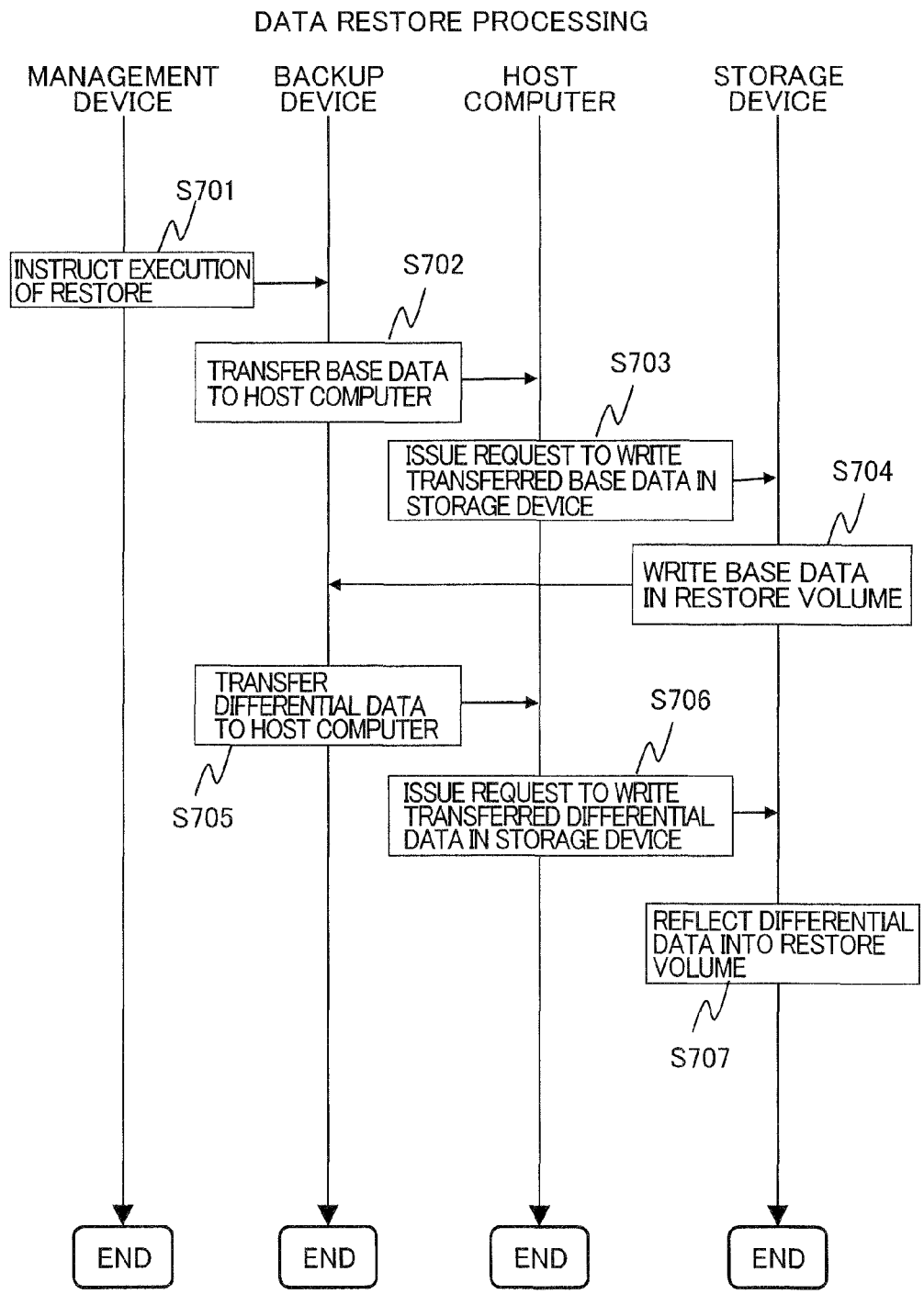
FIG. 32 is a flow chart describing details of data restore processing (S402).

FIG. 32 is a flow chart describing the details of the data restore processing (S402). Firstly, a restore instruction is transmitted from the management device 400 to the backup device 300 (S701). Upon receipt of the aforementioned restore instruction, the backup device 300 transfers the base data stored in the base volume to the host computer 200 (S702).

Upon receipt of the base data transferred from the backup device 300, the host computer 200 transmits a write request to the storage device 100 (S703). The storage device 100 writes the written data in the storage area (restore destination volume) reserved by the storage area reservation processing (S401) (S704). The backup device 300 transfers the differential data stored in the differential volume to the host computer 200 (S705).

The host computer 200 transmits a write request to the storage device 100 for the differential data transmitted from the backup device 300 (S706). The storage device 100 reflects the data specified by the aforementioned write request into the restore destination volume (S707). The data restore processing (S402) is performed in the manner described above.

EXAMPLE 2

Next, a description will be given of Example 2.

Figure 33:
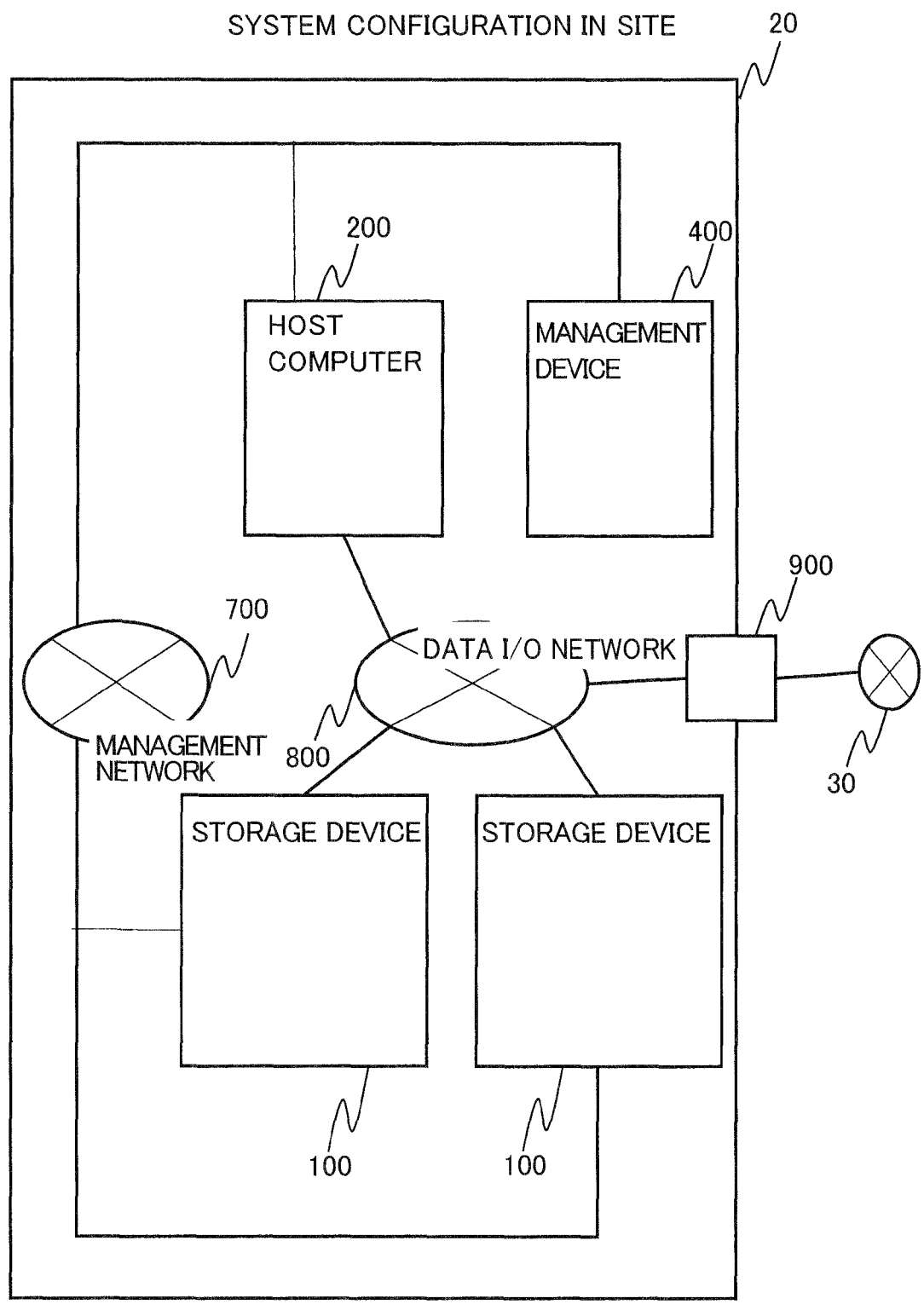
FIG. 33 is a diagram showing a configuration of a device group of an information system 1 described as Example 2.

FIG. 33 shows a configuration of a device group of the information system 1 described as Example 2 and shows a schematic configuration of the device group in the local site 10 or the remote site 20. Unlike Example 1 (FIG. 2), a component equivalent to the backup device 300 does not exist in Example 2. In Example 2, the main functions of the backup device 300 in Example 1 are included in the storage device 100. The details of the physical configuration of each device shown in FIG. 33 are the same as those in Example 1.

Figure 34:
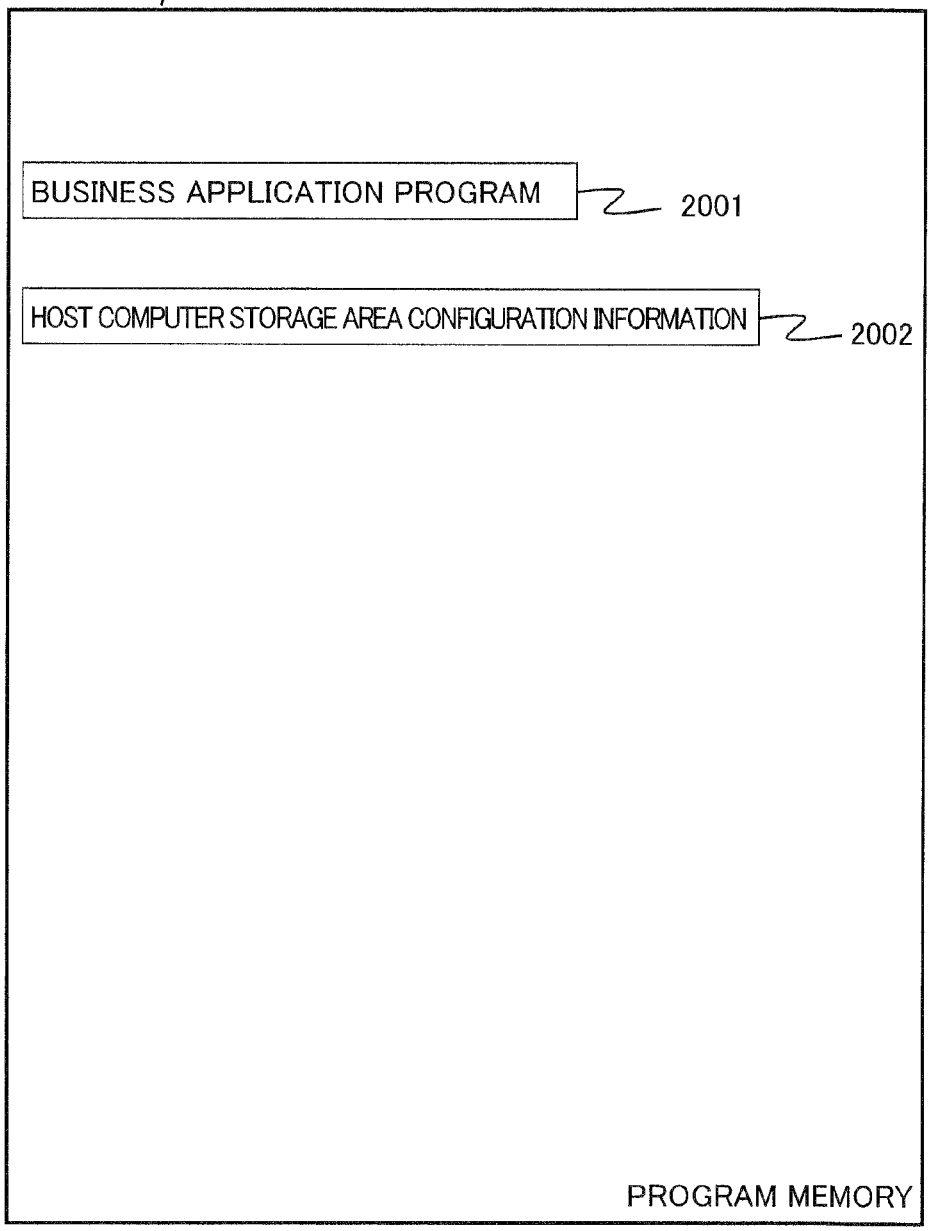
FIG. 34 is a diagram showing a program and information (data) stored in the program memory 2000 of the host computer 200.

FIG. 34 shows a program and information (data) stored in the program memory 2000 of the host computer 200. As shown in FIG. 34, the business application program 2001 and host computer storage area configuration information 2002 are stored in the program memory 2000. Unlike Example 1, the write data reference mechanism 2100 does not exist in the program memory 2000 in Example 2.

Figure 35:
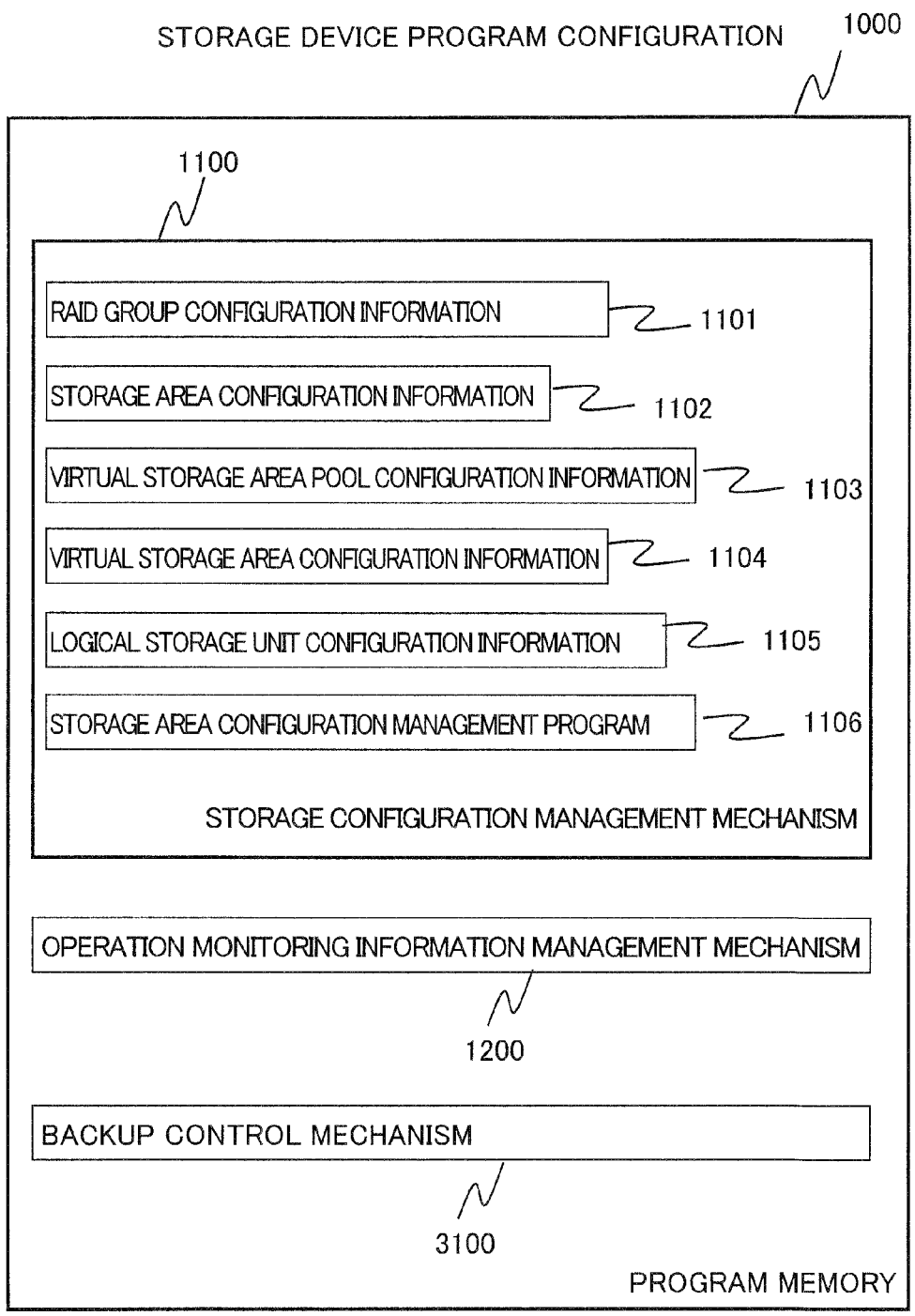
FIG. 35 is a diagram showing a program and information (data) stored in the program memory 1000 of the storage device 100.

FIG. 35 shows a program and information (data) stored in the program memory 1000 of the storage device 100. As shown in FIG. 35, the program memory 1000 stores, therein, a program and information forming each mechanism of the storage configuration management mechanism 1100, an operation monitoring information management mechanism 1200 and the backup control mechanism 3100. The details of the storage configuration management mechanism 1100 and the operation monitoring information management mechanism 1200 are the same as those in Example 1. The backup control mechanism 3100 implements a function corresponding to the function of the backup device 300 in Example 1, and transfers write data from the host computer 200 to the remote site 20 and manages base data and differential data, for example.

Figure 36:
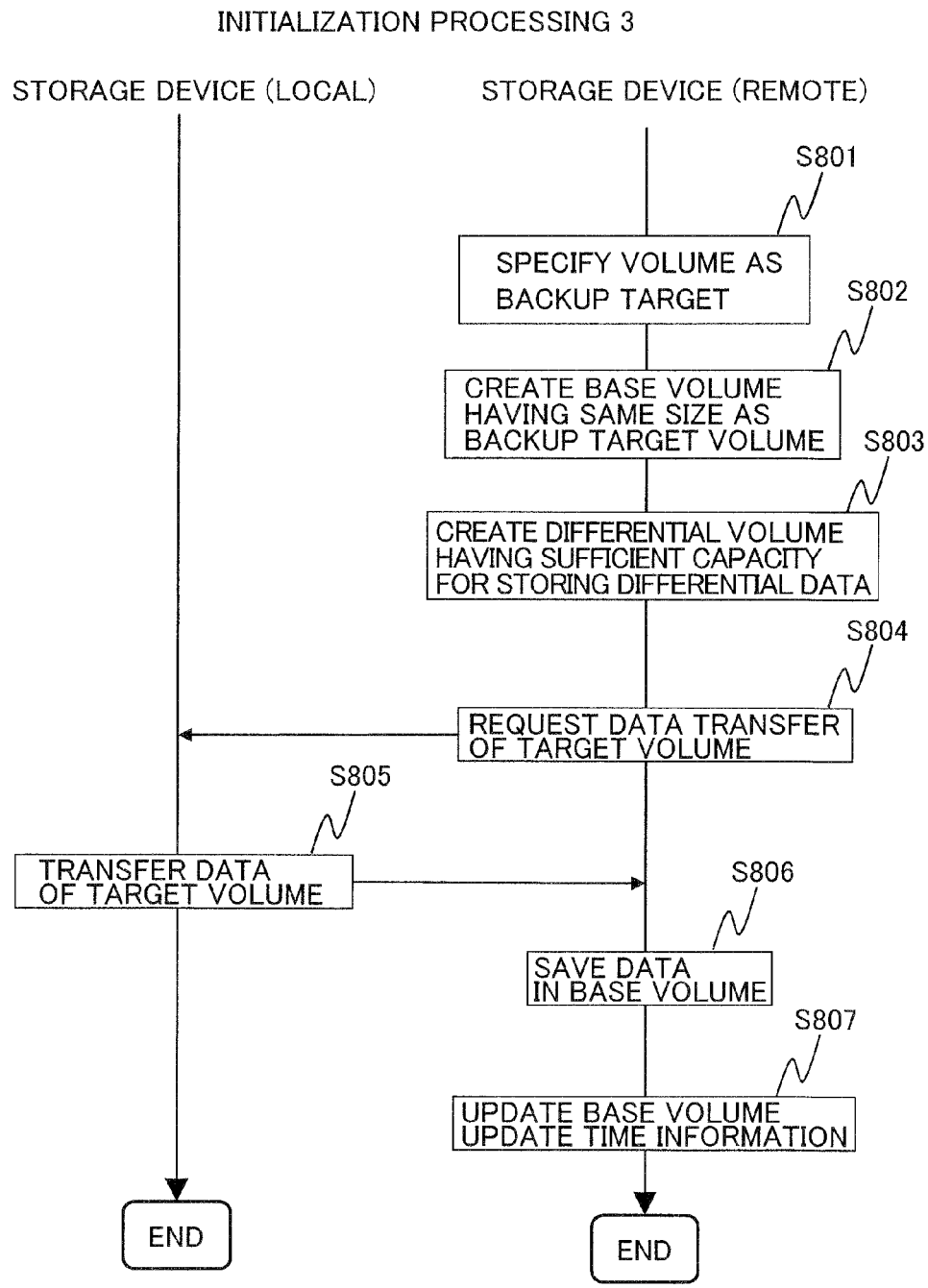
FIG. 36 is a flow chart describing initialization processing 3.

FIG. 36 is processing (initialization processing 3) corresponding to the processing (initialization processing 1) in FIG. 25 of Example 1. As shown in FIG. 36, in Example 2, the data of the storage area of the host computer 200, which is used by the business application program 2001 or the like, is copied in the storage device 100 of the remote site 20 instead of the backup device 300. The other processing is the same as that in Example 1.

Figure 37:
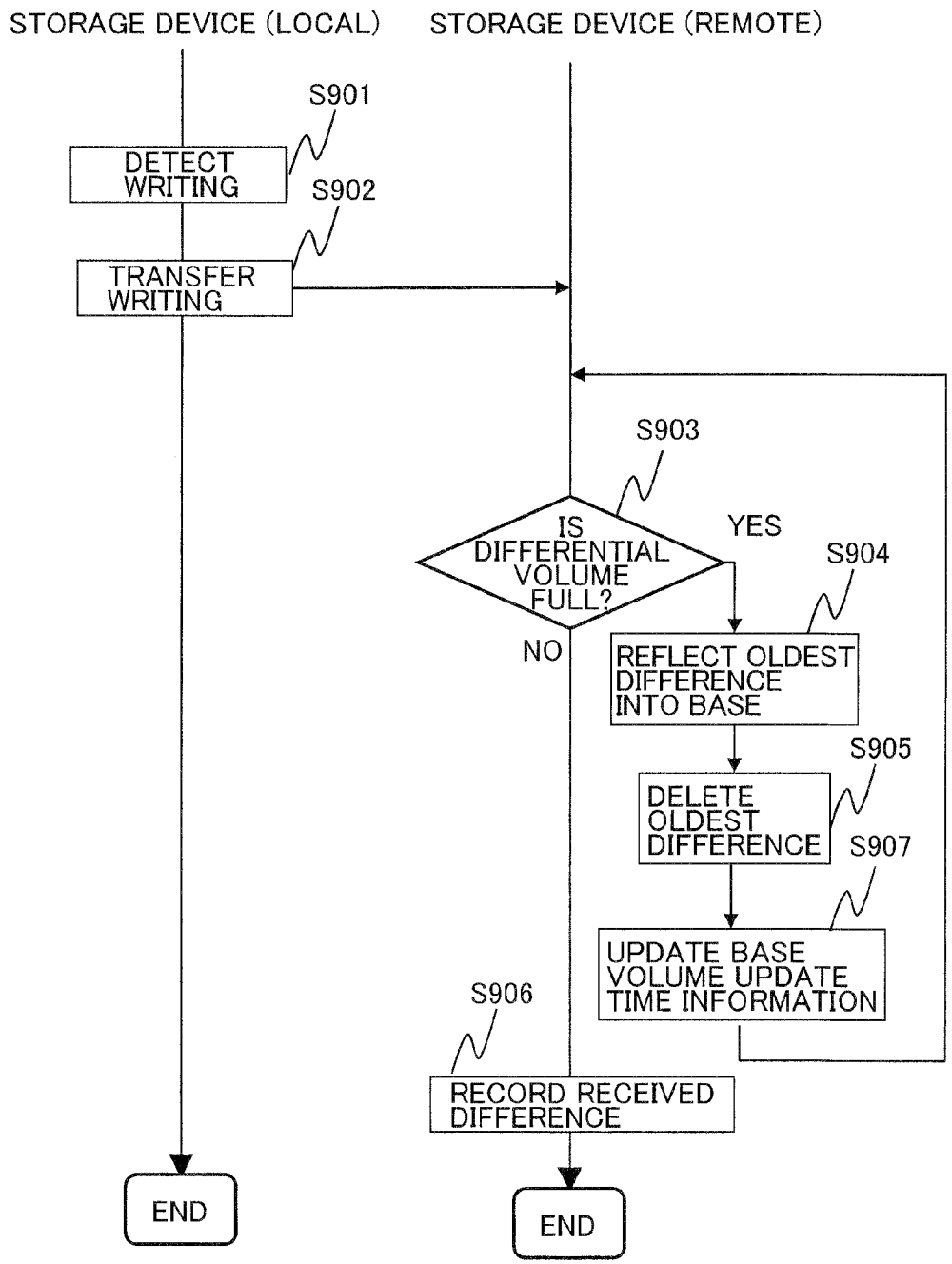
FIG. 37 is a flow chart describing processing performed in the information system 1.

FIG. 37 is processing corresponding to the processing in FIG. 27 in Example 1. As shown in FIG. 37, in Example 2, the data written in the storage device 100 of the local site 10 is copied in the storage device 100 of the remote site 20 instead of the backup device 300. The other processing is basically the same as that in Example 1.

As described above, even when the configuration not including the backup device 300 in the local site 10 and the remote site 20 is employed, the same functions as those in Example 1 can be implemented, and the same effects as those in Example 1 can be obtained.

EXAMPLE 3

Example 3 employs the configuration of the information system 1 shown in Example 1 or Example 2 as the basis. Example 1 or Example 2 relates to a technique to predict a storage capacity to be required in the volume of the restore destination in the future. However, Example 3 relates to a technique to estimate a required performance predicted for the volume of the restore destination.

Figure 38:
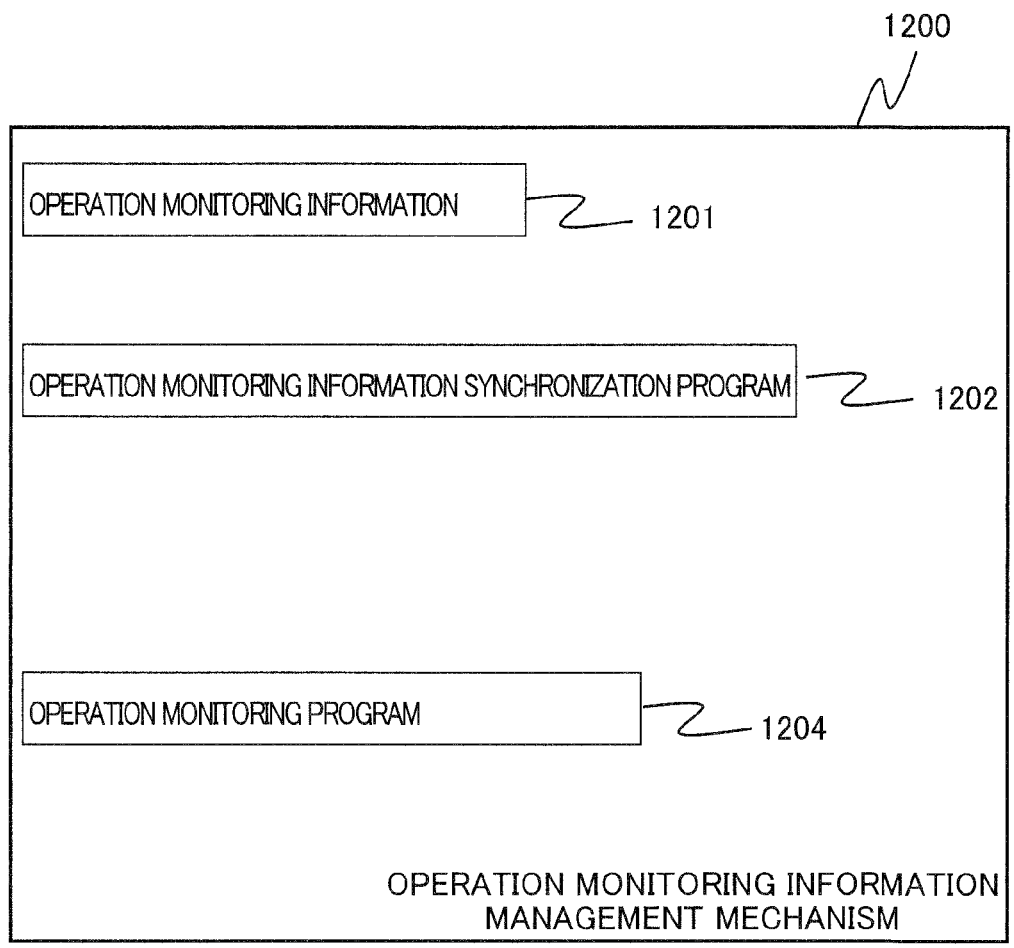
FIG. 38 is a diagram showing details of the operation monitoring information management mechanism 1200.

FIG. 38 shows the details of the operation monitoring information management mechanism 1200 stored in the program memory 1000 by the storage device 100 of each of the local site 10 and the remote site 20, in Example 1 or Example 2. As shown in FIG. 38, the operation monitoring information management mechanism 1200 includes operation monitoring information 1201, an operation monitoring information synchronization program 1202 and an operation monitoring program 1204.

FIG. 39 shows an example of the operation monitoring information 1201. As shown in the drawing, the operation monitoring information 1201 manages results of IOPS (I/O Per Second) and a throughput 12013 monitored in time series for each combination of communication interface identification information 12011 and logical storage unit identification information 12012.

The operation monitoring program 1204 is a program that monitors the access performance of the IOPS, the throughput and the like of the storage area of the storage device 100 and records the IOPS, the throughput and the like in the operation monitoring information 1201. The operation monitoring information synchronization program 1202 is a program that synchronizes the operation monitoring information 1201 in each of the storage devices 100 in the local site 10 and the remote site 20.

Figure 40:
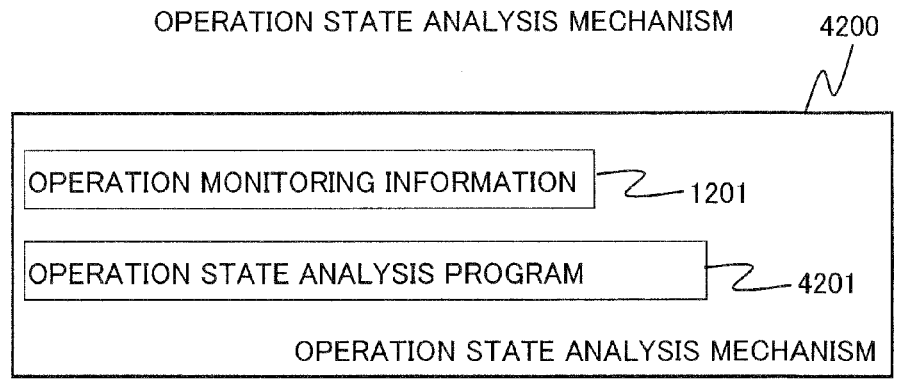
FIG. 40 is a diagram showing an example of an operation state analysis mechanism 4200.

FIG. 40 shows an example of an operation state analysis mechanism 4200 stored in the program memory 4000 of the management device 400. An operation state analysis program 4201 calculates a performance predicted to be required in the future from the past operation states on the basis of the operation monitoring information 1201. The performance predicted to be required in the future is calculated by use of a statistical calculation method or the like from the history of the past data input/output retained by the operation monitoring information 1201.

Figure 41:
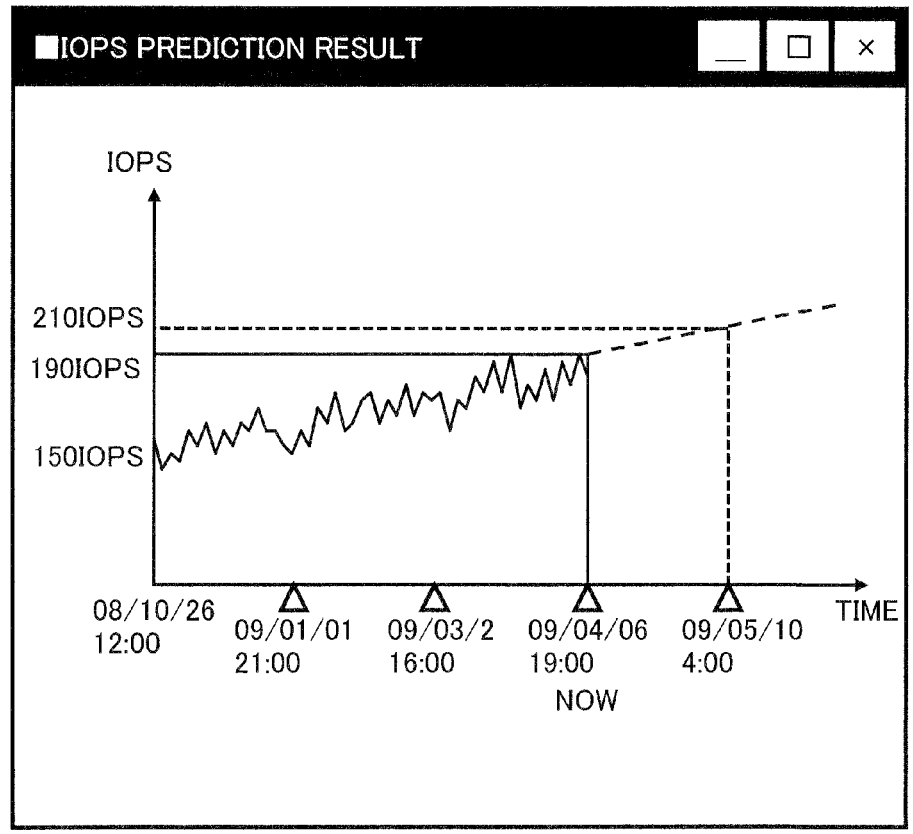
FIG. 41 is an example of an output screen of a load prediction result.

FIG. 41 is an example of an output screen of the IOPS prediction result to be provided to the restore operator. The management device 400 outputs, as a graph shown in FIG. 41, the calculated result of the performance predicted to be required in the future from the past operation states on the basis of the operation monitoring information 1201. In FIG. 41, the solid line indicates changes of the IOPS until a failure occurs in the local site 10, and the broken line indicates a prediction of a transition of the IOPS after the occurrence of the failure. Here, there is normally a linear relationship between the number of disk spindles of the magnetic storage 140 and the performance of the IOPS, throughput or the like. Thus, when a graph such as that shown in FIG. 41 is provided, the restore operator or the like can properly design the virtual volume in the remote site 20 while taking into consideration the performance to be required in the future. For example, in the case of selecting a disk implementing a volume to be added according to the IOPS, it becomes possible to determine that a disk of a faster response is added for the large IOPS and a disk of a not-so-fast response is added for the small IOPS.

While the embodiment of the present invention has been described, it is to be understood that the aforementioned embodiment is for the purpose of facilitating the understanding of the invention and not for the purpose of restrictively construing the invention. Changes and modifications may be made thereto without departing from the spirit and scope of the invention and equivalents thereof are included in the invention. For example, a mechanism to automatically create a volume on the basis of the result predicted by the management device 400 can be provided to the storage device 100, the volume having the capacity predicted after a predetermined period of time.

The invention claimed is:
1. An information system comprising:
a local site including;
a first storage device communicatively coupled to a first host computer and that stores data sent from the first host computer in a first volume,
a management device communicatively coupled to the first storage device,
a remote site that is a destination of write data from the local site, including, and a second storage device communicatively coupled to a second host computer and that stores data to be accessed from the second host computer in a second volume, wherein the management device calculates a capacity of the first volume used for update correlated with an update time and date as an update history of the capacity, and finds, based on the update history of the capacity, a capacity of the second volume to be required after a predetermined period of time, wherein the second storage device includes a second virtual volume and, according to a request of data write into the second virtual volume, dynamically allocates a storage area from the second volume in units of page, wherein the management device includes a memory in which address information storing an address of a base volume which is a volume storing a state of the first volume at a particular point of time, an address information storing an address of a differential volume storing an update difference of the first volume after the particular point of time, information of update time and date of the base volume, and information of update time and date of the differential volume, based on the address information of the base volume, the address information of the differential volume, the information of update time and date of the base volume, and the information of update time and date of the differential volume stored in the memory, the management device acquires a range of address where the base volume and the differential volume are stored and the update times and dates, wherein the management device calculates, as the update history of the volume, a capacity of the first volume used for update from the range of address correlated with the update times and dates, wherein the management device predicts a capacity of the second volume to be required for data write from the first volume after a predetermined period of time based on the update history of the volume, and wherein the output device outputs a graph showing, in a time series manner, the update history of the volume and a capacity of the second volume to be required for data copy from the first volume after a predetermined period of time, the capacity predicted based on the update history of the volume.

2. An information system comprising:

a local site including;

a first storage device communicatively coupled to a first host computer and that stores data sent from the first host computer in a first volume, a management device communicatively coupled to the first storage device, a remote site that is a destination of write data from the local site, including, and a second storage device communicatively coupled to a second host computer and that stores data to be accessed from the second host computer in a second volume, wherein the management device calculates a capacity of the first volume used for update correlated with an update time and date as an update history of the capacity, and finds, based on the update history of the capacity, a capacity of the second volume to be required after a predetermined period of time, wherein the management device includes a memory in which address information storing an address of a base volume which is a volume storing a state of the first volume at a particular point of time, an address information storing an address of a differential volume storing an update difference of the first volume after the particular point of time, information of update time and date of the base volume, and information of update time and date of the differential volume, based on the address information of the base volume, the address information of the differential volume, the information of update time and date of the base volume, and the information of update time and date of the differential volume stored in the memory, the management device acquires a range of address where the base volume and the differential volume are stored and the update times and dates, wherein the management device calculates, as the update history of the volume, a capacity of the first volume used for update from the range of address correlated with the update time and date, wherein the management device predicts a capacity of the second volume to be required for data write from the first volume after a predetermined period of time based on the update history of the volume.

3. An information system comprising:

a local site including;

a first storage device communicatively coupled to a first host computer and that stores data sent from the first host computer in a first volume, a management device communicatively coupled to the first storage device, a remote site that is a destination of write data from the local site, including, and a second storage device communicatively coupled to a second host computer and that stores data to be accessed from the second host computer in a second volume, wherein the management device calculates a capacity of the first volume used for update correlated with an update time and date as an update history of the capacity, and finds, based on the update history of the capacity, a capacity of the second volume to be required after a predetermined period of time, wherein the second storage device includes a second virtual volume and, according to a request of data write into the second virtual volume, dynamically allocates a storage area of the second volume to the second virtual volume in units of page.

4. The information system according to claim 3, wherein the first storage device includes a first virtual volume and, according to a request of data write into the first virtual volume, dynamically allocates a storage area of the first volume to the first virtual volume in units of page, wherein the management device stores a page allocation history from the storage area of the first volume to the first virtual volume, and wherein the management device calculates a capacity of the second volume to be required for data write from the first volume after a predetermined period of time based on the page allocation history from the storage area of the first volume to the first virtual volume.

5. The information system according to claim 2, wherein the second volume is provided according to a capacity of the second volume as predicted.

6. The information system according to claim 5, wherein the second volume is automatically provided according to a capacity of the second volume as predicted.

7. She information system according to claim 2, further comprising;

an output device communicatively coupled to the management device, wherein the output device outputs, in a time series manner, a capacity of the second volume to be required for data write from the first volume after a predetermined period of time based on the update history of the volume.

8. The information system according to claim 7, wherein the output device outputs a graph showing, in a time series manner, the update history of the volume and a capacity of the second volume to be required for data write from the first volume after a predetermined period of time, the capacity predicted based on the update history of the volume.

9. The information system according to claim 7, wherein the management device includes a memory storing I/O information of the first volume, and wherein the output device outputs the I/O information of the first volume.

10. A management device coupled to a first storage device, wherein the first storage device stores data sent from a first host computer in a first volume and sends the data to a second storage device including a second volume as a destination of data write, wherein the management device calculates, as an update history of the first volume, a capacity of the first volume used for update correlated with an update time and date, wherein the management device predicts a capacity of the second volume to be required after a predetermined period of time based on the update history of the first volume, wherein the management device includes a memory in which address information storing an address of a base volume which is a volume storing a state of the first volume at a particular point of time, an address information storing an address of a differential volume storing an update difference of the first volume after the particular point of time, information of update time and date of the base volume, and information of update time and date of the differential volume, based on the address information of the base volume, the address information of the differential volume, the information of update time and date of the base volume, and the information of update time and date of the differential volume stored in the memory, the management device acquires a range of address where the base volume and the differential volume are stored and the update times and dates, wherein the management device calculates, as the update history of the volume, a capacity of the first volume used for update from the range of address correlated with the update time and date, and wherein the management device predicts a capacity of the second volume to be required for data write from the first volume after a predetermined period of time based on the update history of the volume.

11. The management device according to claim 10, wherein the second storage device includes a second virtual volume and, according to a request of data write into the second virtual volume, dynamically allocates a storage area of the second volume to the second virtual volume in units of page.

12. The management device according to claim 11, wherein the first storage device includes a first virtual volume and, according to a request of data write into the first virtual volume, dynamically allocates a storage area of the first volume to the first virtual volume in units of page, wherein the management device stores a page allocation history from the storage area of the first volume to the first virtual volume, and wherein the management device calculates a capacity of the second volume to be required for data write from the first volume after a predetermined period of time based on the page allocation history from the storage area of the first volume to the first virtual volume.

13. The management device according to claim 11, wherein the management device is communicatively coupled to an output device, and wherein the management device sends the output device a graph showing, in a time series manner, the update history of the volume and a capacity of the second volume to be required for data write from the first volume after a predetermined period of time, the capacity predicted based on the update history of the volume for outputting from the output device.

* * * * *